United States Patent
Sakamoto

(10) Patent No.: US 8,131,280 B2
(45) Date of Patent: Mar. 6, 2012

(54) WIRELESS TERMINAL, BASE DEVICE, WIRELESS SYSTEM, WIRELESS TERMINAL CONTROL METHOD, WIRELESS TERMINAL CONTROL PROGRAM, AND COMPUTER-READABLE STORAGE MEDIUM STORING SAME PROGRAM

(75) Inventor: Kenji Sakamoto, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 613 days.

(21) Appl. No.: 10/553,000

(22) PCT Filed: Apr. 15, 2004

(86) PCT No.: PCT/JP2004/005431
§ 371 (c)(1),
(2), (4) Date: Jul. 31, 2006

(87) PCT Pub. No.: WO2004/093436
PCT Pub. Date: Oct. 28, 2004

(65) Prior Publication Data
US 2007/0060152 A1 Mar. 15, 2007

(30) Foreign Application Priority Data

Apr. 16, 2003 (JP) ................. 2003-112031
Apr. 12, 2004 (JP) ................. 2004-117274
Apr. 13, 2004 (JP) ................. 2004-118326

(51) Int. Cl.
*H04M 3/00* (2006.01)

(52) U.S. Cl. ........ 455/418; 455/419; 455/420; 455/522; 725/80; 348/14.11

(58) Field of Classification Search .................... 725/80; 455/418, 464
See application file for complete search history.

(56) References Cited

U.S. PATENT DOCUMENTS

| | | | |
|---|---|---|---|
| 5,467,341 A | | 11/1995 | Matsukane et al. |
| 6,097,441 A | * | 8/2000 | Allport ......................... 348/552 |
| 6,574,266 B1 | * | 6/2003 | Haartsen ....................... 375/133 |
| 6,819,944 B1 | * | 11/2004 | Sato ............................. 455/566 |
| 6,930,661 B2 | * | 8/2005 | Uchida et al. .................. 345/87 |
| 6,934,538 B1 | | 8/2005 | Sakaguchi |
| 6,993,363 B1 | * | 1/2006 | Hsu .............................. 455/567 |

(Continued)

FOREIGN PATENT DOCUMENTS

CN 1296339 A 5/2001

(Continued)

*Primary Examiner* — Lester Kincaid
*Assistant Examiner* — Isaak R Jama
(74) *Attorney, Agent, or Firm* — Birch, Stewart, Kolasch & Birch, LLP

(57) ABSTRACT

A wireless AV system includes a central wireless unit, serving as a base device, and a TV main unit. The TV main unit includes an SS transmitter/receiver (T/R) unit, a TV section, a TV microcomputer, and a second SS-CPU. The SS T/R unit receives an MPEG-2 stream and command transmission data both of which are transmitted from an SS T/R unit of the central wireless unit, and decodes the MPEG-2 stream and the command transmission data so received. The TV section displays a video signal and outputs an audio signal. The TV microcomputer controls the TV main unit entirely. The second SS-CPU detects a communication condition between the central wireless unit and the TV main unit according to a received radio wave field intensity and a retransmission request made based on an error rate.

19 Claims, 17 Drawing Sheets

U.S. PATENT DOCUMENTS

| | | | |
|---|---|---|---|
| 7,167,679 B2 * | 1/2007 | Sano | 455/41.2 |
| 7,210,158 B1 * | 4/2007 | Forler | 725/31 |
| 7,360,000 B2 * | 4/2008 | Takita et al. | 710/72 |
| 2001/0021998 A1 * | 9/2001 | Margulis | 725/81 |
| 2002/0018057 A1 | 2/2002 | Sano | |
| 2002/0021685 A1 | 2/2002 | Sakusabe | |
| 2003/0072257 A1 * | 4/2003 | Ikedo et al. | 370/208 |
| 2004/0152414 A1 * | 8/2004 | Wang | 455/3.04 |
| 2004/0171349 A1 | 9/2004 | Sakaguchi | |

FOREIGN PATENT DOCUMENTS

| | | | |
|---|---|---|---|
| EP | 1 176 763 A2 | | 1/2002 |
| EP | 1 326 382 A1 | | 7/2003 |
| GB | 230672 | | 3/1925 |
| GB | 2 343 334 A | | 5/2000 |
| GB | 2 352 589 A | | 1/2001 |
| JP | 10-56667 A | | 2/1998 |
| JP | 10-98756 A | | 4/1998 |
| JP | 11-69406 A | | 3/1999 |
| JP | 11-205844 A | | 7/1999 |
| JP | 2000-23226 A | | 1/2000 |
| JP | 2001-136581 A | | 5/2001 |
| JP | 2001-160927 A | | 6/2001 |
| JP | 2002-33676 A | | 1/2002 |
| JP | 2002-35581 A | | 11/2002 |
| JP | 2003-23663 A | | 1/2003 |
| JP | 2003-101812 A | | 4/2003 |
| WO | WO 2004/045092 | * | 5/2004 |

* cited by examiner

FIG. 5  (2) TRANSITION FROM NORMAL VIEWING (GOOD RECEPTION SENSITIVITY) STATE (4) TRANSITION FROM "OUT OF COMMUNICATION RANGE" STATE

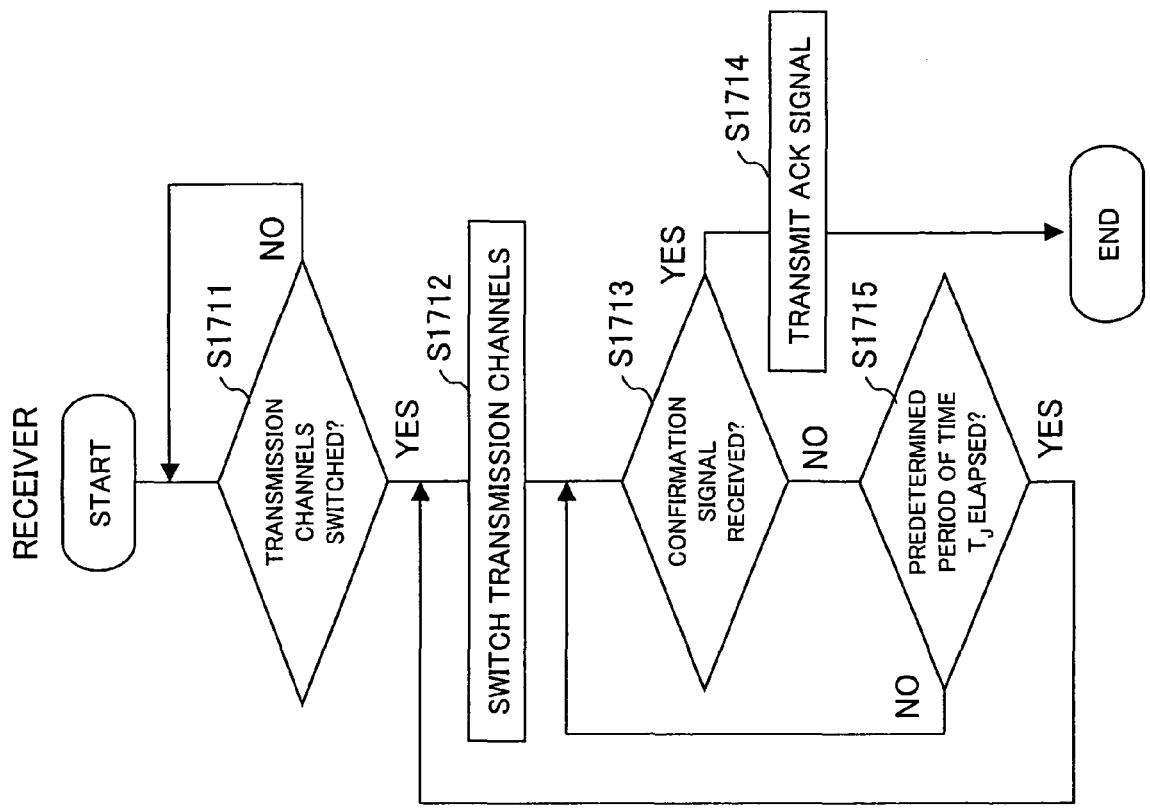
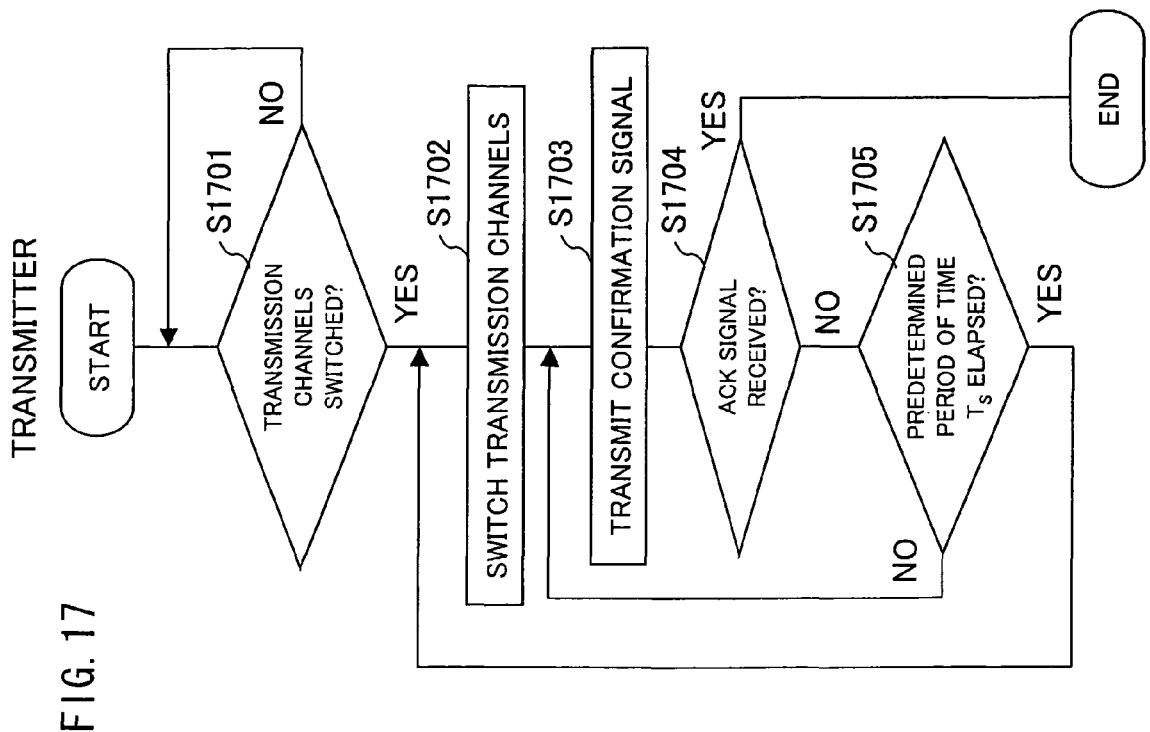
FIG. 17

WIRELESS TERMINAL, BASE DEVICE, WIRELESS SYSTEM, WIRELESS TERMINAL CONTROL METHOD, WIRELESS TERMINAL CONTROL PROGRAM, AND COMPUTER-READABLE STORAGE MEDIUM STORING SAME PROGRAM

TECHNICAL FIELD

The present invention relates to a wireless terminal, a base device, a wireless system, a wireless terminal control method, a wireless terminal control program, and a computer-readable storage medium storing the same program.

BACKGROUND ART

Along with the recent explosive growth of the Internet, LANs (Local Area Networks) have been set up in more offices and households. Due in part to improvements in digital wireless communications technologies, there has been a rapidly growing need for a wireless LAN (i.e., a LAN that is set up wirelessly in order to remove the burden of cabling). Furthermore, partly because the wireless LAN can be used in a mobile environment of a mobile terminal as typified by a laptop computer, the wireless LAN is expected to be used in appreciable numbers in the future. A representative technology of the wireless LAN is the IEEE 802.11, which is standardized by the IEEE (Institute of Electrical and Electronics Engineers). This standardized technology defines an OSI (Open System Interconnection) model from a physical layer to an MAC (Media Access Control) layer, which serves as a lower layer of a data link. Further, the IEEE 802.11 can replace the Ethernet (registered trademark), which is a transmission channel in the wired LAN. Furthermore, the IEEE 802.11 is specified to provide a roaming function, which is an optional function peculiar to a wireless method.

Further, new terrestrial digital broadcasting is now being prepared to replace terrestrial analog broadcasting, which is currently viewed in Japan. Terrestrial digital broadcasting was initiated in 2003 in three major metropolitan areas of Kanto, Kinki, and Tokai, and will be expanded nationwide by 2006. Accordingly, the existing analog broadcasting will be discontinued by 2011.

ISDB (Integrated Services Digital Broadcasting) is a concept of next-generation integrated digital broadcasting which handles, as digital data, various types of information such as video, audio, and data. Digital television broadcasting, digital audio broadcasting, facsimile broadcasting, multimedia broadcasting, and other types of digital broadcasting are being studied as specific ISDB services. Satellite broadcast waves, terrestrial broadcast waves, and cable transmission paths such as coaxial cable and fiber optics may be used as ISDB transmission paths.

In a terrestrial digital broadcasting technical standard called the ISDB-T (Terrestrial) standard, OFDM (Orthogonal Frequency Division Multiplexing), which uses a large number of carriers, is adopted as a modulation method. This makes it possible to suppress ghost interference caused by a plurality of propagation paths (multi-path) formed when, e.g., each of the carriers is reflected by a building. Further, the ISDB-T standard specifies a plurality of transmission modes which define carrier intervals, a plurality of carrier-specific modulation methods, and a plurality of time-axial guard intervals which are set up every effective symbol length, thereby theoretically allowing for an extremely large number of signal formats. Practically, an optimum format is selected among the signal formats, in accordance with a service such as fixed reception or mobile reception.

Further, in the ISDB-T standard, a single transmission channel (communication channel) (having a bandwidth of approximately 5.6 MHz) is divided into thirteen segments (each of which occupies approximately 430 kHz), and the modulation methods are changed in accordance with the thirteen segments as a unit. This enables a broadcasting station to arbitrarily decide a signal arrangement by, e.g., allocating a signal transmission channel to audio broadcasting and Hi-Vision broadcasting, or by allocating a single transmission channel to standard fixed broadcasting and mobile broadcasting.

Furthermore, the ISDB-T incorporates time-axial interleaving and uses a radio wave suitable for mobile transmission. Therefore, one important characteristic of the ISDB-T lies in that stable reception is made possible at a mobile receiver (e.g., an on-board television) and a portable terminal (e.g., a PDA (Personal Digital Assistant) or a mobile phone). In future, there is a high degree of expectation for a service assuming such mobile reception.

Incidentally, a bandwidth of data transmission is reduced when a pair of a transmitter and a receiver communicates with each other by using a specific frequency (a transmission channel) at which another pair of a transmitter and a receiver communicates with each other. In order to avoid this, the devices about to use the transmission channel already occupied by the other devices need to be automatically transferred onto an unused transmission channel.

For example, Patent Document 1 discloses a channel-switching wireless communication device including a wireless communication section. The wireless communication section is provided with a 2.4 GHz band front-end circuit and a 5 GHz band front-end circuit so as to accommodate to the 2.4 GHz and 5 GHz bands. This makes it possible, in a wireless LAN system, to greatly increase the number of transmission channels which can be set simultaneously in the same area. This allows reduction of the risk of an interfering radio wave interrupting a communications link.

[Patent Document 1]
Japanese Unexamined Patent Publication No. 33676/2002 (Tokukai 2002-33676; published on Jan. 31, 2002) (FIG. 1)

However, the transmission channel switching in such a conventional wireless communication device causes interruption of the communication, so that an image is not displayed. Therefore, the conventional wireless communication device has such a problem that a user has no way of knowing whether an image has been interrupted or a communication terminal has switched transmission channels.

The present invention is made in view of the foregoing problems and has as an object to provide a wireless terminal, a base device, a wireless system, a wireless terminal control method, a wireless terminal control program, and a computer-readable storage medium storing the wireless terminal control program, all of which prevents the user from being bothered by a feeling of discomfort even when image display is interrupted due to the switching of the transmission channels or the like, thereby improving user-friendliness.

Further, the present invention has an object to provide a wireless terminal, a base device, a wireless system, a wireless terminal control method, a wireless terminal control program, and a computer-readable storage medium storing the wireless terminal control program, all of which can maintain a communication condition as optimum as possible in a network as a whole.

DISCLOSURE OF INVENTION

In order to solve the foregoing problems, a wireless terminal according to the present invention includes: an SS transmitter/receiver (T/R) unit (communication means) for exchanging, with a base device, either (i) video and/or audio data (video data and/or audio data), or (ii) a control command containing transmission channel switching information; an SS-CPU (communication condition detection means) for detecting a communication condition; and a TV section (indication means) for indicating at least a transmission condition of the control command, according to the communication condition detected by the SS-CPU.

Further, a wireless terminal control method according to the present invention is a method for controlling a wireless terminal which constitutes a wireless system having the wireless terminal and a base device connected to each other through a wireless network, the method including the steps of: exchanging, with the base device, either (i) video and/or audio data, or (ii) a control command containing transmission channel switching information; detecting a communication condition; and indicating at least a transmission condition of the control command, according to the communication condition that has been detected.

According to the foregoing arrangement, it is possible to indicate the transmission condition of the control command exchanged between the wireless terminal and the base system. Examples of the control command are a "confirmation signal" and an "ACK signal". The "confirmation signal" is a signal which the base device transmits so as to confirm the presence of the wireless terminal, which serves as its communication partner. The "ACK signal" is a signal which the wireless terminal transmits on receiving the confirmation signal. Moreover, when the transmission condition of the control command deteriorates, the wireless terminal notifies the user of the status for example by displaying an indication message. Examples of the indication message include: "OUT OF COMMUNICATION RANGE, which indicates that the wireless terminal is out of reach of radio waves; "POOR RECEPTION", which indicates that the wireless terminal is in poor radio wave conditions; "NOW SEARCHING FOR TRANSMITTER", which indicates that the wireless terminal is switching transmission channels so as to find the transmitter to communicate with; "NOW BEING CONNECTED", which indicates that the wireless terminal has found the transmitter and is now executing connection setup; and other messages.

Therefore, the foregoing wireless terminal makes it possible to prevent the user from being bothered by a feeling of discomfort even when an image display is interrupted due to transmission channel switching or the like, so that user-friendliness can be improved.

Furthermore, the wireless terminal according to the present invention may include a TV microcomputer (transmission channel maintaining means) for (i) measuring time from which communication is interrupted, and (ii) maintaining a transmission channel until a predetermined period of time has elapsed since interruption of the communication.

The foregoing arrangement makes it possible to prevent frequent transmission channel switching and to maintain an optimum communication condition entirely in the network.

For a fuller understanding of the nature and advantages of the invention, reference should be made to the ensuing detailed description taken in conjunction with the accompanying drawings.

BRIEF DESCRIPTION OF DRAWINGS

FIG. 17 is a flow chart showing a process of switching transmission channels in the central wireless unit and the TV main unit of the wireless AV system shown in FIG. 1.

BEST MODE FOR CARRYING OUT THE INVENTION

A preferred embodiment of the present invention will be described in detail below with reference to the accompanying drawings.

Figure 1:
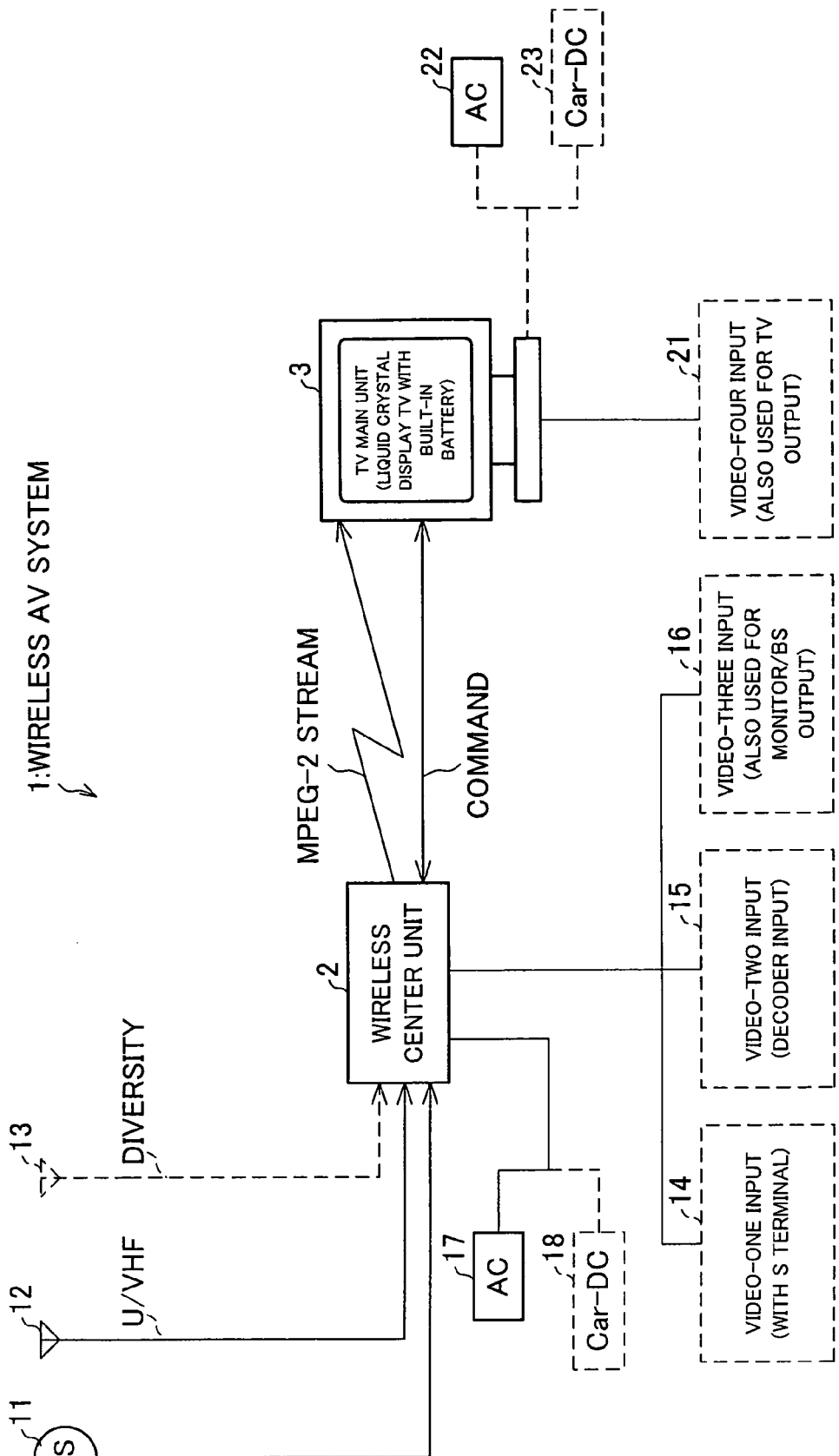
FIG. 1 is a block diagram showing an arrangement of a wireless AV system according to one embodiment of the present invention.
Figure 10:
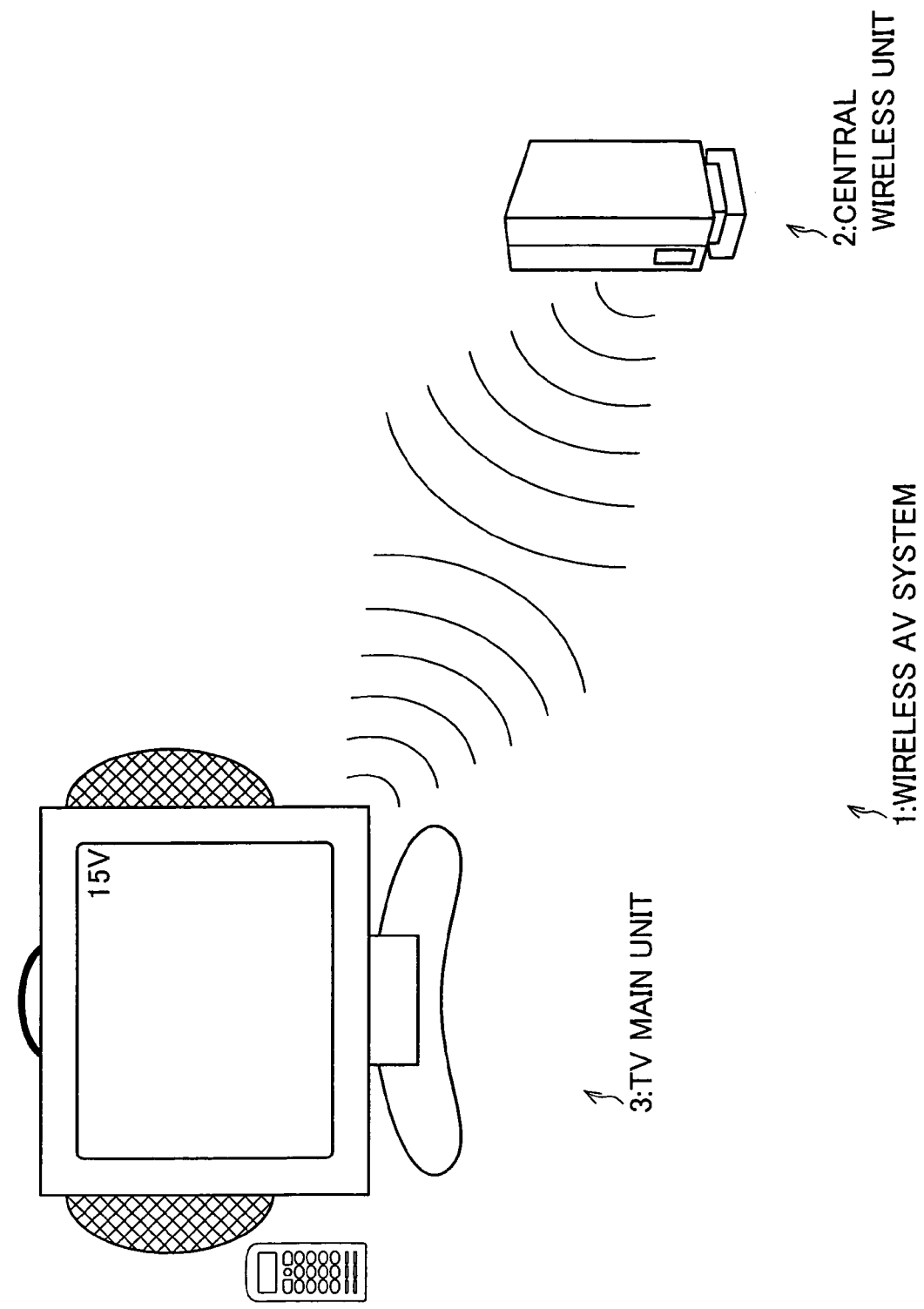
FIG. 10 is an explanatory diagram schematically showing the wireless AV system shown in FIG. 1.

FIG. 1 is a block diagram showing an arrangement of a wireless AV system 1 according to one embodiment of the present invention. The wireless AV system 1 of the present embodiment is an example of applying the present invention to a separate-display wireless TV receiver. FIG. 10 is an explanatory diagram schematically showing the wireless AV system 1 serving as the separate-display wireless TV receiver.

As shown in FIGS. 1 and 10, the wireless AV system 1 includes: a central wireless unit 2 serving as a base device; and a television (TV) main unit 3 serving as a portable terminal (wireless terminal). The central wireless unit 2 (wireless communication apparatus, central apparatus) and the TV main unit 3 (wireless communication apparatus, display apparatus) are paired to form a wireless transmission network.

As shown in FIG. 10, the TV main unit 3 is a wireless unit having a built-in battery. Further, the TV main unit 3 is equipped with a remote controller for remotely controlling a VCR (video cassette recorder) and other devices. Further, the central wireless unit 2 is connected to (i) antennas such as a BS antenna and a U/VHF antenna; (ii) AV devices such as a DVD player and the VCR; and the like. Moreover, the video and/or audio data is transmitted wirelessly from the central wireless unit 2 to the TV main unit 3.

As shown in FIG. 1, the central wireless unit 2 includes: (i) various antenna terminals such as, a BS terminal 11, a U/VHF antenna terminal 12, and a diversity terminal 13; (ii) a video-one input (with an S-terminal) 14; (iii) a video-two input (decoder input) 15, (iv) a video-three input (also used for monitor/BS output) 16, an AC power supply section 17, and a Car-DC power supply section 18. A device such as a digital VCR or the DVD player can be connected to the video-one input 14, the video-two input 15, and the video-three input 16.

The TV main unit 3 includes: a video-four input (used for TV output) 21, to which such a device as a digital VCR or a DVD (Digital Versatile Disc) player is connected; an AV power supply section 22; and a Car-DC power supply section 23.

The TV main unit 3 is a portable or transportable thin-shaped display device having the built-in battery, and can be detached from the central wireless unit 2. The TV main unit 3 is a broad concept which encompasses various display devices such as a liquid crystal display television (hereinafter referred to as "LCD TV"), an inorganic EL/organic EL display, and a plasma display, and is not limited by a display mechanism. Further, in this description, whereas the TV main unit 3 mainly has a display function and an audio function, the central wireless unit 2 mainly has a control function of controlling a tuner section and the TV main unit 3. The following description assumes that TV main unit 3 according to the present embodiment is an LCD TV exemplified as the thin-shaped display device.

The data (video and/or audio data) is exchanged between the central wireless unit 2 and the TV main unit 3, according to an SS (Spread Spectrum) wireless method. The SS wireless method is in conformity with the IEEE 802.11 specification. Since the 5 GHz band has recently become available, the data transmission and data reception may be carried out with the use of the 5 GHz band instead of the 2.4 GHz band. The data transmitted from the central wireless unit 2 to the TV main unit 3 is in conformity with the MPEG (Moving Picture Expert Group) 2 video compression format, and is transmitted via a communication line which allows 10 Mbps transmission of data such as moving image data, DVD-Video data, and digital broadcasting data. Further, command (control command containing transmission channel switching information) transmission is carried out between the central wireless unit 2 and the TV main unit 3, according to the SS wireless method.

When an encoded stream (bit row) such as an MPEG video stream and an MPEG audio stream, and another encoded stream are put into an actual use, the encoded streams need to be synchronized and multiplexed into a single stream, and the single stream needs to be converted into data whose format is in conformity with a physical format or protocol inherent in a storage medium, a network, or the like.

The MPEG-2 system includes the MPEG-2 Program Stream (MPEG-2 PS) and the MPEG-2 Transport Stream (MPEG-2 TS). The MPEG-2 PS, as with the MPEG-1, constitutes a single program. The MPEG-2 TS can constitute a plurality of programs.

The MPEG streams, a large number of which are one-bit flags, are byte streams each arranged based on each unit such as header. The MPEG system as a whole has a common data structure which makes possible highly reliable separation processing. That is, a portion of data having no fixed length is preceded, in the data structure, by a piece of information that indicates the length. When the portion is unnecessary, the portion is skipped or a start of the next group of data is located.

For prevention of overflow and underflow of video and audio signals in a decoder, a device for receiving video and audio signals each compressed in conformity with the MPEG-2 encoding method needs to match (i) the sampling frequencies of the encoded video signal and the encoded audio signal, with (ii) the sampling frequencies or the STCs (System Time Clocks) of decoded video signal and decoded audio signal, respectively.

For this reason, PCR (Program Clock Reference) or SCR (System Clock Reference) specified in the MPEG-2 System specification (ISO/IEC 13818-1) is used in such a decoding device, so that the sampling frequency of decoded video and audio data coincides with that of the encoded video and audio data.

Figure 2:
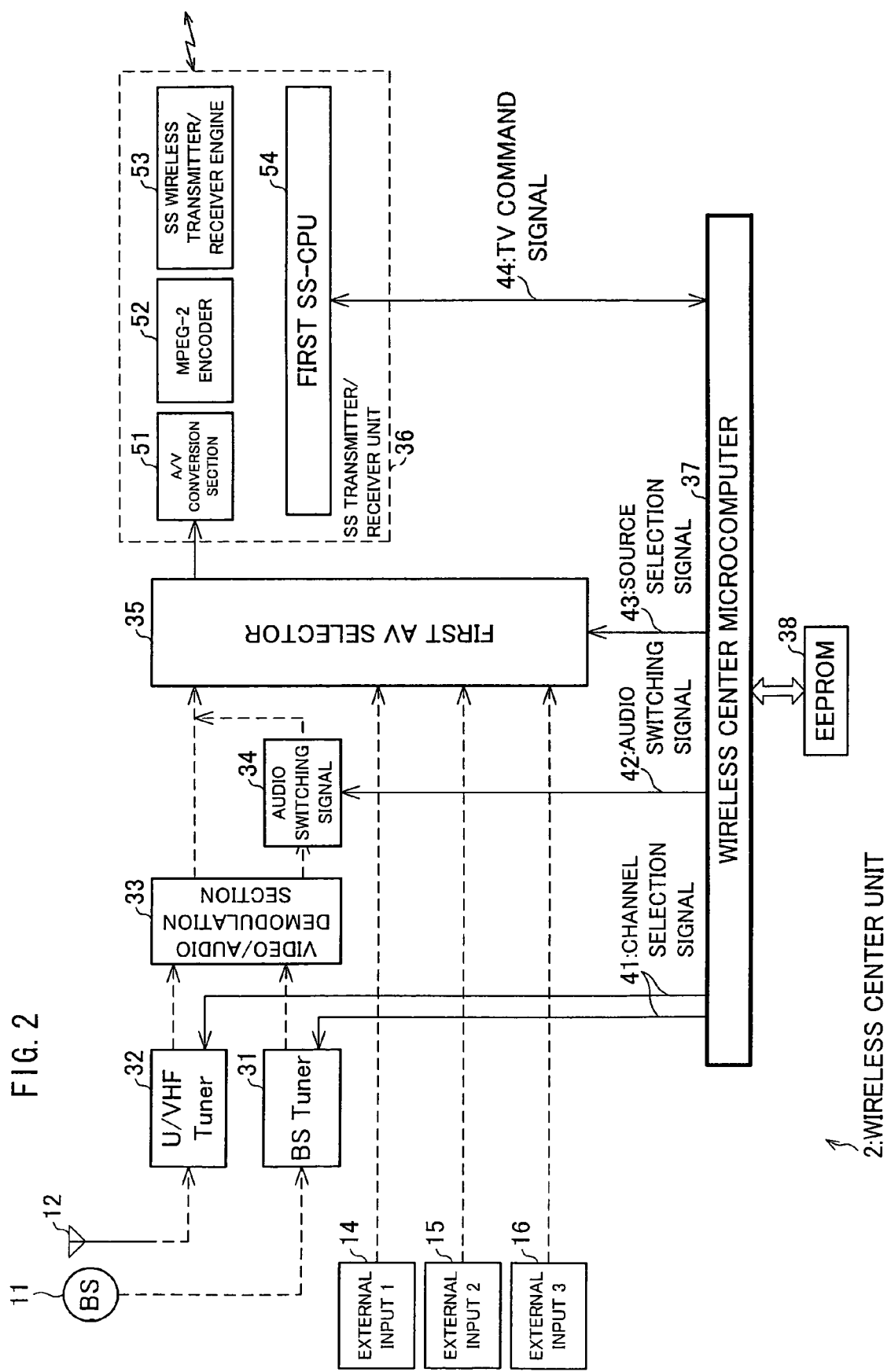
FIG. 2 is a block diagram showing an arrangement of a central wireless unit of the wireless AV system shown in FIG. 1.

FIG. 2 is a block diagram showing an arrangement of the central wireless unit 2 of the wireless AV system 1.

As shown in FIG. 2, the central wireless unit 2 includes a BS tuner 31, a U/VHF tuner 32, a video/audio demodulation section 33, a audio switching section 34, a first AV selector 35, an SS transmitter/receiver (T/R) unit 36 (communication means), a central wireless microcomputer 37 (transmission channel maintaining means), and an EEPROM (electrically erasable programmable ROM) 38. The BS tuner 31 is connected to the BS terminal 11, and receives and selects a BS broadcasting program in accordance with a channel selection signal. The U/VHF tuner 32 is connected to the U/VHF antenna terminal 12 and receives and selects a U/VHF broadcasting program according to the channel selection signal. The video/audio demodulation section 33 demodulates a video/audio (AV) signal selected and received by the BS tuner 31 or the U/VHF tuner 32. The audio switching section 34 switches, according to an audio switching signal, between received audio switching signal and program-related information such as EPG (Electrical Program Guide). The first AV selector 35 selects, according to a source selection signal, (i) received video/audio information; (ii) the program-related information; and (iii) information externally inputted via the video-one input (external input 1) 14, the video-two input (decoder input; external input 2) 15, and the video-three input (used for monitor/BS output; external input 3) 16. The SS T/R unit 36 transmits and receives a TV command signal 44, converts the data selected by the first AV selector 35 into data which is compliant with MPEG-2 video compression format, and transmits the data to the TV main unit 3 according the SS wireless method. The central wireless microcomputer 37 transmits the channel selection signal 41, the audio switching signal 42, and the source selection signal 43, and entirely controls the central wireless unit 2 by transmitting and receiving the TV command signal 44. The EEPROM 38 is an electrically rewritable nonvolatile memory which stores various types of data such as a control program of the central wireless microcomputer 37, communications control data, and a transmission channel switching program.

The central wireless unit 2 includes the plural (two in this arrangement) broadcast receiving tuners, and at least one of the BS tuner 31 and the U/VHF tuner 32 may be a tuner capable of receiving terrestrial digital broadcasting.

The SS T/R unit 36 includes an A/D conversion section 51, an MPEG-2 encoder 52, an SS wireless T/R engine 53, and a first SS-CPU 54. The A/D conversion section 51 converts the data selected by the first AV selector 35 into a digital signal. The MPEG-2 encoder 52 converts the data into data which is in conformity with the MPEG-2 video compression format. The SS wireless T/R engine 53 includes: (i) an SS wireless device for transmitting the data in accordance with the SS wireless method; and (ii) a wireless control section. The first SS-CPU 54 controls each of the components of the SS wireless T/R unit 36 and detects a radio wave condition.

The SS wireless T/R engine 53 has functions of: (i) transmitting the MPEG-2 stream, a command, and the like to an SS T/R unit 61 (described later and see FIG. 4) of the TV main unit 3; and (ii) transmitting and receiving commands and the like to and from the SS T/R unit 61.

By changing programs to be written in the EEPROM 38, various specifications of the central wireless unit 2 and the TV main unit 3 can be changed. That is, a program ROM such as a nonvolatile memory (e.g., an EPROM or EEPROM) is used for the sake of avoiding a time loss incurred by changing mask ROMs for each debugging in system development, so that it is possible to greatly reduce time required for program development and modification. Further, the EEPROM's program content can be rewritten by downloading a program into the EEPROM, and this makes it easy to upgrade and change functions.

Figure 3:
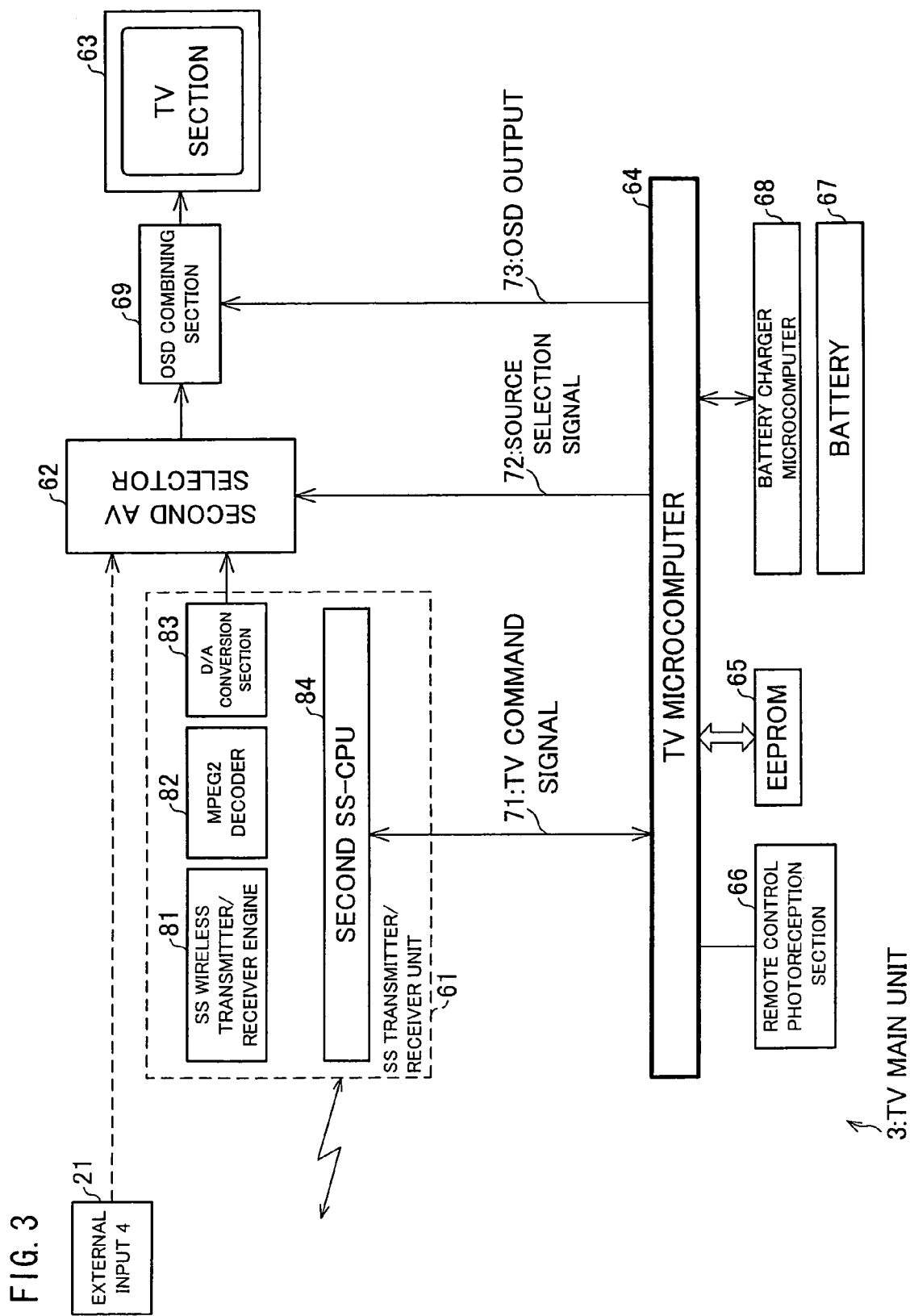
FIG. 3 is a block diagram showing an arrangement of a TV main unit of the wireless AV system shown in FIG. 1.

FIG. 3 is a block diagram showing an arrangement of the TV main unit 3 of the wireless AV system 1.

As shown in FIG. 3, the TV main unit 3 includes the SS T/R unit 61 (communication means), a second AV selector 62, a TV section 63 (part of indication means), a TV microcomputer 64 (part of the indication means, transmission channel maintaining means), an EEPROM 65, a remote control (RC) photoreception section 66, a battery 67, and a battery charger microcomputer 68. The SS T/R unit 61 transmits and receives a TV command signal 71 so as to receive the MPEG-2 stream and the command transmission data which are transmitted from the SS T/R unit 36 of the central wireless unit 2, and decodes the received MPEG-2 stream and the command transmission data into original data, respectively. The second AV selector 62 selects the data decoded by the SS T/R unit 61 and an AV signal sent from outside via the video-four input (used for TV output) 21. The TV section 63 includes an LCD or the like, carries out display in accordance with the video signal, and carries out audio output in accordance with the audio signal. The TV microcomputer 64 transmits and receives the TV command signal 71 and entirely controls the TV main unit 3 by transmitting a source selection signal 72, an OSD (on-screen display) 73, and the like. The EEPROM 65 is an electrically rewritable nonvolatile memory which stores various types of data such as a control program of the TV microcomputer 64, communications control data, and a transmission channel switching program. The RC photoreception section 66 receives a control command from a remote control (RC) device (not shown). The battery charger microcomputer 68 controls charging and discharging of the battery 67.

The SS T/R unit 61 includes an SS wireless T/R engine 81, an MPEG-2 decoder 82, a D/A conversion section 83, and the second SS-CPU 84 (communication condition detection means). The SS wireless T/R engine 81 includes (i) an SS wireless device for receiving data transmitted according to the SS wireless method; and (ii) a wireless control section. The MPEG-2 decoder 82 decodes the received MPEG-2 stream. The D/A conversion section 83 converts the decoded data into an analog signal. The second SS-CPU 84 controls each component of the SS T/R unit 61 and detects a radio wave condition.

The SS wireless T/R engine 81 has functions of: (i) receiving an MPEG-2 stream, a command, and the like from the SS T/R unit 36 of the central wireless unit 2; and (ii) transmitting the command and the like from the SS T/R unit 61.

Particularly, the second SS-CPU 84 functions as radio wave condition detection means for detecting a communication condition (radio wave strength, channel interference) between the central wireless unit 2 and the TV main unit 3, according to a field intensity (electric field intensity) of a received radio wave and a retransmission request based on an error rate. Information indicative of the radio wave condition thus detected is transmitted as the TV command signal 71 to the TV microcomputer 64. The present embodiment is arranged such that the second SS-CPU 84 of the TV main unit 3 has the radio wave condition detection function. However, the present embodiment may be arranged such that: the first SS-CPU 54 of the central wireless unit 2 has the radio wave condition detection function, and the information indicative of the radio wave condition thus detected is transmitted as a command from the central wireless unit 2 to the TV main unit 3. Alternatively, the present embodiment may be arranged such that both of the first SS-CPU 54 and the second SS-CPU 84 have the radio wave condition detection function. Furthermore, the present embodiment may be arranged such that the TV microcomputer 64 or the central wireless microcomputer 37 performs the radio wave condition detection.

The TV microcomputer 64 not only controls the TV main unit 3 entirely but also functions as indication means for indicating, according to the detected communication condition, such reception sensitivity information messages that video and/or audio data has been interrupted, that transmission channels are being switched, that connection are being made, and that the TV main unit 3 is out of communication range.

Figure 4:
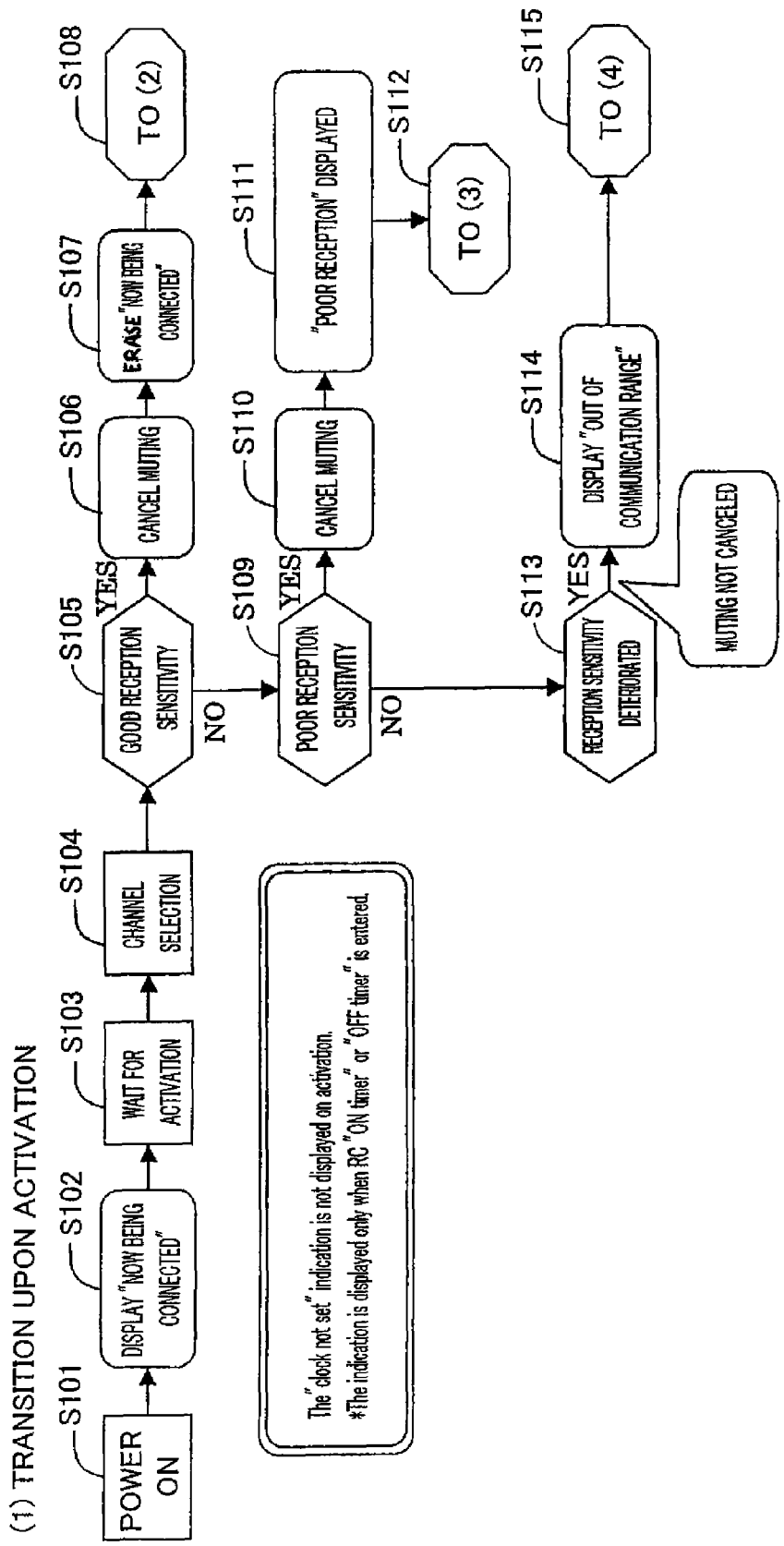
FIG. 4 is a state transition diagram for explaining a method for switching transmission channels in the wireless AV system shown in FIG. 1.

Further, the TV microcomputer 64 measures a period of time during which the communication is interrupted, and performs transmission channel switching control such that the transmission channel is maintained until a predetermined period of time has elapsed since the interruption of the communication. A specific example of the transmission channel switching control will be described later with reference to FIG. 4 through FIG. 9. Further, the TV microcomputer 64 has an OSD generation function section, and causes the OSD generation function section to display, on a TV screen or other screens, information such as a program channel, time, and volume. Such information is displayed on a screen of a general image device (e.g., a TV) or a general electronic device (e.g., a teleconference system). Such OSD data is not stored in the form of an image but stored in the form of a bitmap. The bitmap is converted into pixel values that are in compliant with the YUV format and that are represented by Y, Cb, and Cr. Pixels expresses the pixel values thus converted, with the result that the information is so displayed as to be superimposed on an original image such as a TV broadcast. Further, when connecting the video-four input terminal (used also as a TV output terminal) to an image playback device (not shown) such as a DVD player, the OSD data can be so displayed as to be superimposed on an original image shown on the display screen. The superimposing of the OSD display on the original image is carried out by an OSD combining section 69 (FIG. 4).

As described above, the TV microcomputer 64 displays a program channel. The program channel is displayed according to the information obtained through the transmission and the reception of the control command between the central wireless unit 2 and the TV main unit 3. That is, the TV microcomputer 64 can display information sent from the central wireless unit 2 with which the communications link is established, according to the control command thus received.

Further, the TV main unit 3 includes a speaker, a key input section, a slot, and the like, all of which are not shown. The TV main unit 3 may be arranged such that: a card-type external extended storage medium can be inserted into and ejected from the slot, and data is read out directly from the card-type external extended storage medium when the card-type external extended storage medium is inserted into the slot. Examples of the card-type external extended storage medium are an SRAM (Static RAM) card, a compact flash (CF) (registered trademark) memory card, a smart media, a memory stick, and a micro hard disk drive (HDD). The SRAM card must be supplied with power backup in order to retain information. The compact flash includes a flash memory which does not need to be supplied with power backup. The micro hard disk drive is roughly the size of the compact flash (registered trademark) memory card or can be inserted into a PC-card Type II.

The RC photoreception section 66 is an optical communication port which uses IR (infrared rays) and receives an optical signal from the RC device for controlling the central wireless unit 2 or the TV main unit 3 in various ways. Specifically, the RC photoreception section 66 is either an I/O port or a wireless communication port which uses radio waves. The I/O port performs optical communication in conformity with standards (e.g., IrDA (Infrared Data Association) and ASK) for transmitting data by using infrared rays.

The battery 67 supplies power to each section of the TV main unit 3. The battery charger microcomputer 68 detects a state in which the battery 67 can be charged, for example when the TV main unit 3 is connected to the central wireless unit 2, a cradle, or the like. Then, the battery charger microcomputer 68 carries out control such that a charge medium (not shown) of the battery charger 67 is charged and discharged via a power supply terminal (not shown). Specifically, the battery charger microcomputer 68 calculates a total discharge current of a battery pack. When the battery charger microcomputer 68 determines that a remaining capacitance of the battery pack is below a predetermined value, the battery charger microcomputer 68 starts charging. During the charging, the battery charger microcomputer 68 calculates a total charging current supplied to the battery pack. When the battery charger microcomputer 68 determines that the battery pack is fully charged, the battery charger microcomputer 68 stops the charging. The battery 67 thus charged serves as a main power supply of the TV main unit 3 when the TV main unit 3 is disconnected from a commercial power supply so as to serve as a portable TV. In this way, the battery 67 supplies power to each component of the TV main unit 3.

Operation of the wireless AV system 1 thus arranged will be described below.

Figure 5:
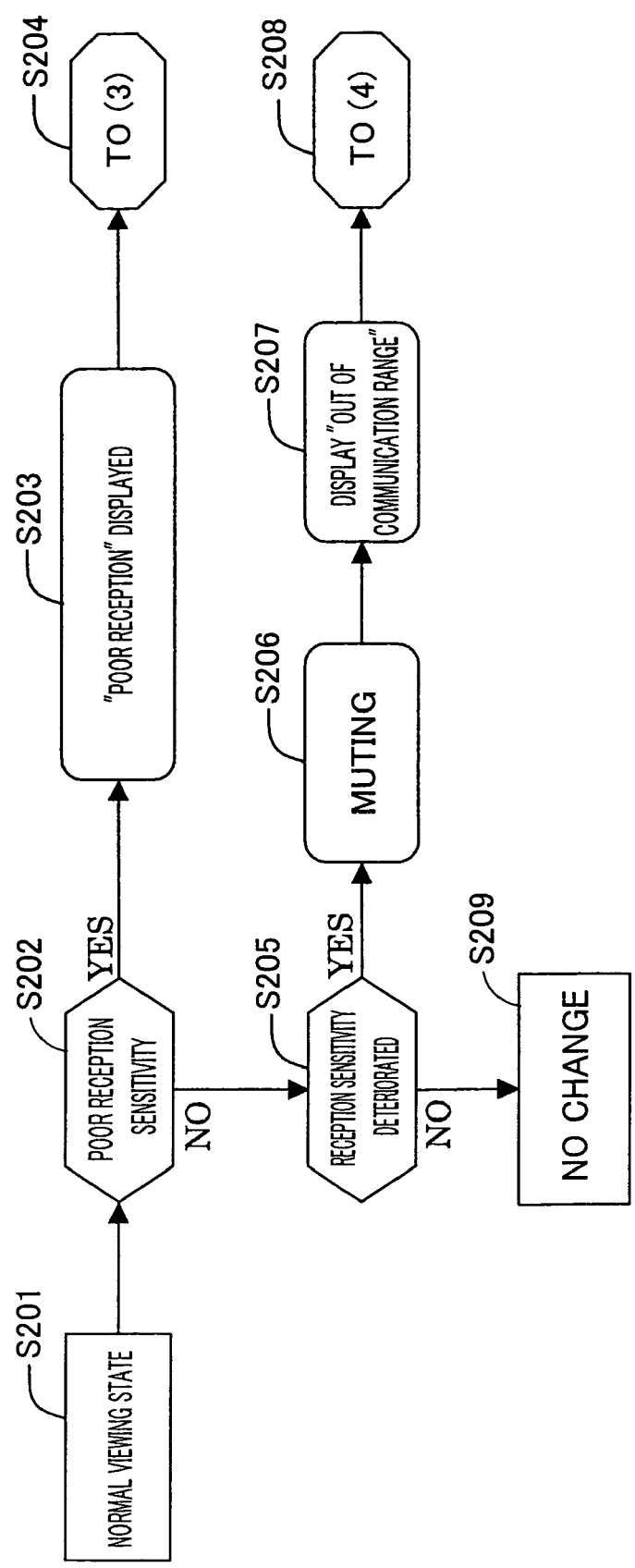
FIG. 5 is a state transition diagram for explaining a method for switching transmission channels in the wireless AV system shown in FIG. 1.
Figure 6:
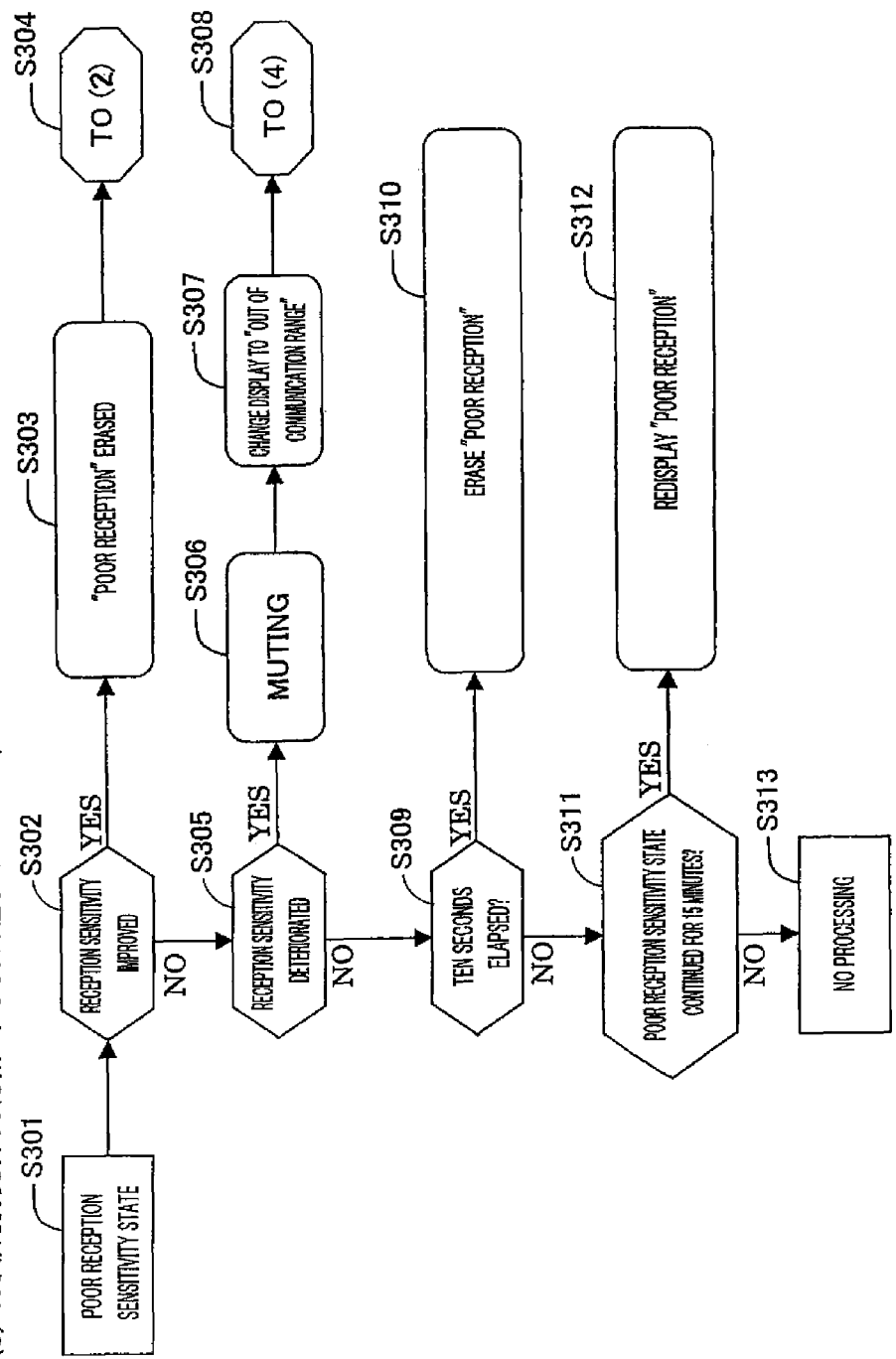
FIG. 6 is a state transition diagram for explaining a method for switching transmission channels in the wireless AV system shown in FIG. 1.
Figure 7:
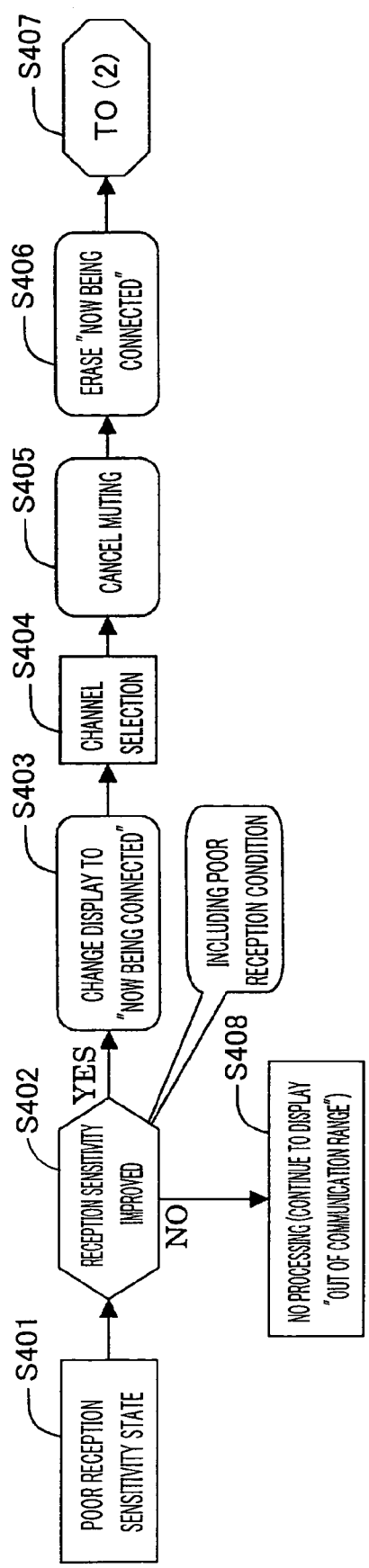
FIG. 7 is a state transition diagram for explaining a method for switching transmission channels in the wireless AV system shown in FIG. 1.

FIGS. 4 to 7 are state transition diagrams for explaining a method of switching transmission channels in the wireless AV system 1. FIG. 4 shows (1) Transition upon Activation. FIG. 5 shows (2) Transition from a Normal Viewing (Good Reception Sensitivity) State. FIG. 6 shows (3) Transition from a Poor Reception Sensitivity State. FIG. 7 shows (4) Transition from an "Out of Communication Range" State. The transmission channel switching control is performed by the TV microcomputer 64 of the TV main unit 3. In the figures, reference numerals (step numbers) are indicated as signs for explanatory purposes.

(1) Transition Upon Activation

When the TV main unit 3 is powered on (S101), the TV section 63 displays "NOW BEING CONNECTED" by means of the OSD output 73 (S102), and the TV main unit 3 waits for activation (S103). The "NOW BEING CONNECTED" indication is displayed only when RC "ON timer" or "OFF timer" is entered. Further, an indication "CLOCK NOT SET" is not displayed upon activation.

When the TV main unit 3 is activated, the channel selection is performed on receipt of a control command from the RC device (S104). Hereinafter, the channel selection operation is described in detail. As shown in FIG. 3, the TV microcomputer 64 receives a channel-selection control command from the RC device and transmits the channel-selection control command as the TV command T/R signal 71 to the SS T/R unit 61. The SS T/R unit 61 of the TV main unit 3 transmits the channel-selection control command to the SS T/R unit 36 of the central wireless unit 2 shown in FIG. 2, according to the SS wireless method. The SS T/R unit 36 transmits the channel-selection control command as the TV command T/R signal 44 to the central wireless microcomputer 37. On reception of the control command, the central wireless microcomputer 37 transmits the channel selection signal 41 to the BS tuner 31 or the U/VHF tuner 32. The BS tuner 31 or the U/VHF 32 performs channel selection. Thus, the transmission of the command data is carried out between the central wireless unit 2 and the TV main unit 3, whereas the basic data transmission of the MPEG-2 stream is carried out from the central wireless unit 2 to the TV main unit 3 in accordance with the SS wireless method. Described above is an example of the channel selection command transmission. However, audio selection command transmission and source selection command transmission are also performed in the same manner.

Returning to the description of (1) Transition upon Activation of FIG. 4, the TV microcomputer 64 determines whether or not reception sensitivity is good, according to information on the communication condition (radio wave strength, channel interference) between the central wireless unit 2 and the TV main unit 3, the communication condition being detected by the second SS-CPU 84 (S105). When the reception sensitivity is good, muting is cancelled (S106), "NOW BEING CONNECTED" is erased (S107), and the state transits to (2) Normal Viewing (Good Reception Sensitivity) State of FIG. 5 (S108). The term "muting" refers to an imageless/soundless process of canceling video and audio noise while switching the signal connections.

Thus, the TV section 63 displays "NOW BEING CONNECTED" by means of the OSD output 73 until the channel selection is completed after the TV main unit 3 is powered on. However, the "NOW BEING CONNECTED" indication is soon erased because the reception sensitivity is good, and the state transits to (2) Normal Viewing State of FIG. 5.

When it is determined in step S105 that the reception sensitivity is not good, it is determined whether or not the reception sensitivity is poor (S109). When the reception sensitivity is poor, the muting is cancelled (S110), the TV section 63 displays "POOR RECEPTION" by means of the OSD output 73 (S111), and the state transits to (3) Poor Reception Sensitivity State of FIG. 6 (S112).

When it is determined in step S109 that the reception sensitivity is not poor, it is determined that the reception sensitivity deteriorates (S113). When the reception sensitivity deteriorates, the muting is not cancelled, the TV section 63 displays "OUT OF COMMUNICATION RANGE" by means of the OSD output 73 (S114), and the state transits to (4) "Out of Communication Range" State of FIG. 7 (S115).

Thus, after the TV main unit 3 is powered on, "NOW BEING CONNECTED" is displayed. When the reception sensitivity is good, the "NOW BEING CONNECTED" indication is erased. When the reception sensitivity is not good, "NOW BEING CONNECTED" is replaced by "POOR RECEPTION" or "OUT OF COMMUNICATION RANGE". Therefore, when a user switches transmission channels, the user is allowed to easily see whether connection is being made, whether an image has been interrupted due to poor reception, or whether the communication terminal has switched transmission channels.

(2) Transition from Normal Viewing (Good Reception Sensitivity) State

When the communication condition (radio wave strength, channel interference) is inputted by the second SS-CPU 84 in the normal viewing state (S201), it is determined whether or not the reception sensitivity is poor (S202). When the reception sensitivity is poor, the TV section 63 displays "POOR RECEPTION" by means of the OSD output 73 (S203) and the state transits to (3) Poor Reception State of FIG. 6 (S204).

When it is determined in step S202 that the reception sensitivity is not poor, it is determined whether or not the reception sensitivity deteriorates (S205). When the reception sensitivity deteriorates, the muting is performed (S206), the TV section 63 displays "OUT OF COMMUNICATION RANGE" by means of the OSD output 73 (S207), and the state transits to (4) "Out of Communication Range" State of FIG. 7 (S208). When it is determined in step S205 that the reception sensitivity does not deteriorate, it is determined there is no change, so that no transition is made (S209).

(3) Transition from "POOR RECEPTION" (Poor Reception Sensitivity State)

In the poor reception sensitivity state (S301), it is determined whether or not the reception sensitivity has been improved, according to the communication state information sent from the second SS-CPU 84 (S302). When the reception sensitivity has been improved, the "POOR RECEPTION" indication is erased (S303), and the state transits to (2) Normal Viewing (Good Reception Sensitivity) State of FIG. 5 (S304).

When it is determined in step S302 that the reception sensitivity has not been improved, it is determined whether the reception sensitivity deteriorates (S305). When the reception sensitivity deteriorates, the muting is performed (S306), the TV section 63 switches the display from "POOR RECEPTION" to "OUT OF COMMUNICATION RANGE" by means of the OSD output 73 (S307), and the state transits to (4) "Out of Communication Range" State of FIG. 7 (S308). When it is determined in step S305 that the reception sensitivity does not deteriorate, it is determined whether a predetermined period of time (10 seconds here) has elapsed (S309). When 10 seconds have elapsed, the "POOR RECEPTION" indication is erased (S310). In a case other than a case where 10 seconds has elapsed, it is determined whether or not the poor reception sensitivity state has continued for a predetermined period of time (15 minutes here) (S311). When 15 minutes have elapsed, it is determined that communication has been interrupted for the predetermined period of time, and the TV section 63 redisplays "POOR RECEPTION" by means of the OSD output 73 (S312). When it is determined in step S311 that 15 minutes have not elapsed, no process is performed. (S313).

(4) Transition from "Out of Communication Range" State

In the poor reception sensitivity state in "out of communication range" (S401), it is determined whether or not the reception sensitivity has been improved, according to the information on the communication condition inputted from the second SS-CPU 84 (S402). When the reception sensitivity has been improved, the display is switched from "POOR RECEPTION" to "NOW BEING CONNECTED" (S403), and the channel selection is performed (S404). The operation of the channel selection has already been specifically described. Then, the muting is cancelled (S405), "NOW BEING CONNECTED" is erased (S406), and the state transits to (2) Normal Viewing (Good Reception Sensitivity State of FIG. 5 (S407).

When it is determined in step S402 that the reception sensitivity has not been improved or is poor, no process is performed (S408). In this case, the "OUT OF COMMUNICATION RANGE" indication continues to be displayed.

The following fully explains how the state transits in cases where there exist a plurality of transmitters and receivers.

Figure 8:
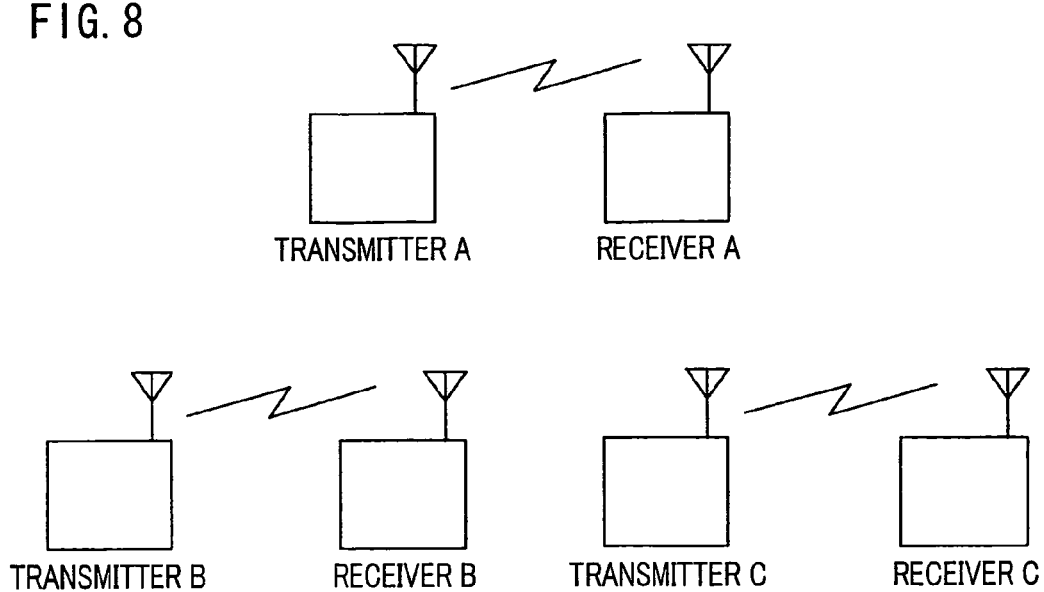
FIG. 8 is a diagram showing transmission and reception of data among a plurality of transmitters/receivers A, B, and C of the wireless AV system shown in FIG. 1.
Figure 9:
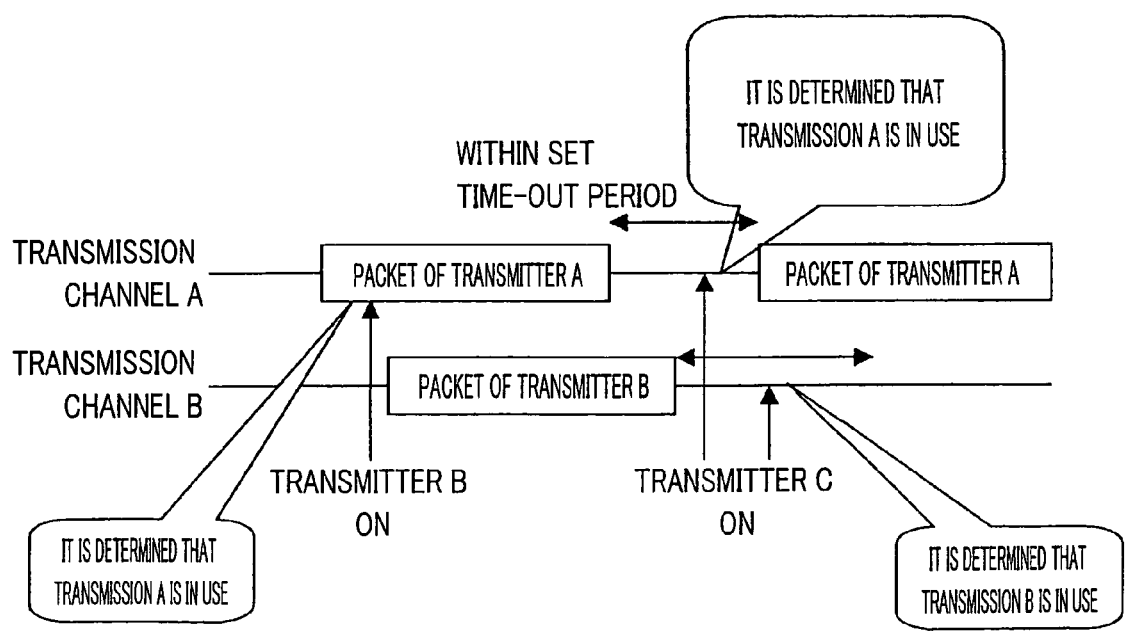
FIG. 9 is a diagram explaining an example of use of transmission channels of the transmitters A, B, and C and the receivers A, B, and C of the wireless AV system shown in FIG. 1.

FIG. 8 is a diagram showing how data transmission and data reception are carried out among a plurality of transmitters A, B, and C and receivers A, B and C, respectively. FIG. 9 is an explanatory diagram showing an example of how the transmitters A, B, and C and the receivers A, B and C uses transmission channels, respectively.

In FIGS. 8 and 9, the transmitter A is for example the central wireless 2 of the LCD TV described above, and the receiver A is the TV main unit 3. Further, the transmitters B and C are central wireless units of other AV devices, and the receivers B and C are portable terminals of the AV devices, respectively.

A technique for realizing a wireless AV system is specified in a standard specification, called the HAVi (Home Audio/Video Interoperability) Architecture, which was standardized in January 2001. As described in the outline (1 General, 1.1 Scope) of the HAVi V1.0 Specification, this specification makes it possible to provide an interface allowing a user to control a device, which is connected to a consumer electronic device and a computer, by using another device. The HAVi specification assumes a network constructed by consumer electronic devices that are in conformity with, e.g., the IEEE 1394 and the IEC (International Electrotechnical Commission) 61883. Further, the outline of the specification describes every user can freely use the devices connected to the network achieved according to the HAVi specification. Thus, the construction of the AV network by connecting the AV devices at home allows the user to freely use the devices in combination, even when the devices are placed in separate rooms.

Further, the transmitters A, B, and C and the receivers A, B, and C may be not only wireless communication terminals in such a home AV network, but also be wireless communication terminals such as mobile phones/PHSs (Personal Handyphone Systems) (registered trademark) or PDAs (Personal Digital Assistants).

Meanwhile, examples of the wireless AV system are a wireless LAN, a Bluetooth system, a UWB (Ultra Wide Band) system. The wireless LAN is widely used for a portable information terminal such as a laptop computer or a PDA, each of which has a wireless LAN function. The Bluetooth system and the UWB system, each of which employs a low-power short-distance two-way wireless communications method, have drawn attention as being used for a mobile phone required to consume less power. The Bluetooth system is a system which performs short-distance two-way wireless communication between a master (server) and a slave (client). The Bluetooth system uses the globally available 2.4 GHz bandwidth, so that the short-distance two-way wireless communication can be carried out anywhere on earth. According to the existing specification, the Bluetooth system allows a communication speed of 1 Mbps, but will allow 2 Mbps in the future. However, an actual transmission rate of the Bluetooth system via the transmission channels is such a rate that allows either (i) synchronous audio communication with the use of up to three transmission channels, or (ii) audio synchronous communication and data synchronous communication with the use of a single transmission channel. Further, in cases where the Bluetooth system uses an asynchronous channel, the Bluetooth system supports either (i) two-way connection of 721 Kbps and a return connection of 57.6 Kbps, or (iii) a symmetric link of 432.6 Kbps.

FIG. 9 is an explanatory diagram showing a process of switching transmission channels of the wireless AV system. In cases where the wireless system is compliance with the IEEE 802.11 specification, respective bandwidths of 14 transmission channels ch1 to ch14 are allocated within a 2.4 GHz band ranging from 2.400 GHz to 2.483 GHz. However, when a plurality of transmission channels are set simultaneously in the same area, neighboring channels are so specified as to be located at a frequency interval of 25 MHz or higher. This is because high-frequency signals to be transmitted and received are so modulated to respectively have predetermined bandwidths, so that the respective signals transmitted via the transmission channels whose frequencies are adjacent to each other interfere with each other. For this reason, the number of channels which can be set simultaneously in the same area is limited at most to three transmission channels: transmission channels A, B, and C (transmission channel C is not shown) shown in FIG. 9. So, there will be transmission channel scarcity when a wireless LAN is set up in each household of a residential area in which houses built so closely to each other, or in each room of a building having rooms adjacent to one another.

Therefore, in a wireless network, when a pair of a transmitter and a receiver is about to communicate with each other at a specific frequency (on a transmission channel) used by another pair of a transmitter and a receiver, the pair about to communicate with each other needs to be automatically transferred onto an unused transmission channel.

In the example shown in FIG. 9, the transmitter A performs packet communication with the receiver A by using the transmission channel A. At this time, since the transmitter A uses the transmission channel A, the transmitter B performs packet communication with the receiver B by using the transmission channel B, which is different from the transmission channel A. Furthermore, since the transmitters A and B use the transmission channels A and B respectively, the transmitter C performs packet communication with the receiver C by using the transmission channel C, which is different from the transmission channels A and B.

However, there is some case where it is not easy for the transmitter C to determine whether or not another transmitter (e.g., the transmitter A) is performing packet communication. That is, when the transmitter A is not transmitting a stream for some reason (e.g., when a stop button is pressed to stop an image), the transmitter C determines that the transmission channel A is available and starts to use the transmission channel A. In such a case, since the transmission channel A is used by the transmitter C, the transmitter A must search for a new transmission channel before performing communication again. It may take approximately three seconds to switch transmission channels because such processes as initialization are performed at the same time.

While the transmission channels are being switched, the stream is also interrupted. When the communication condition is interrupted due to the switching of the transmission channels as such, the present embodiment notifies the user of whether the image has been interrupted or the receivers/transmitters have switched the transmission channels, by means of such messages as "NOW BEING CONNECTED", "NOW SEARCHING FOR TRANSMISSION CHANNEL", "POOR RECEPTION", and "OUT OF COMMUNICATION RANGE" as described in detail with reference to FIGS. 4 to 7. (These messages may be either notified by way of display or sound production or may be notified by way of both the display and the sound production.) In this way, the user is not bothered by a feeling of discomfort.

Furthermore, the present embodiment carries out such control that: a period of time during which communication is interrupted on a transmission channel is measured, and when the period during which the communication is interrupted falls within a predetermined set time-out period, it is determined that the transmission channel is in use. This control is performed by a control section of each of the transmitters and the receivers. For example, in the case of the wireless AV system shown in FIGS. 1 to 3, the control is performed by the central wireless microcomputer 37 and/or the TV microcomputer 64. The process of measuring the period of time during which the communication is interrupted and the process of determining that a transmission channel is in use are performed by a control section of a device which is about to use the transmission channel.

In the example shown in FIG. 9, while the transmitter A performs packet communication with the receiver A by using the transmission channel A, the transmission channel A is occupied by the transmitter A. Therefore, the transmitter B performs packet communication with the receiver B by using the transmission channel B, which is different from the transmission channel A. Here, see a case where the transmitter C is about to perform communication at a point of time shown in FIG. 9. On this occasion, the transmitters A and B do not carry out the packet transmissions; however, the period during which the packet communication is interrupted falls within the set time-out period, so that the transmission channels A and B are so determined as to be in use. With this, the transmission channel A or the transmission channel B is never used by the transmitter C. This makes it possible to prevent a frequent switching of the transmission channels in advance, and to maintain an optimum communication condition entirely in the network.

In the following, a process of detecting a state of "out of communication range" will be described with reference to FIGS. 11 to 15. This detection process is performed by the first SS-CPU in the central wireless unit 2, and by the second SS-CPU in the TV main unit 3 but may be performed by the central wireless microcomputer 37 in the central wireless unit 2, and by the TV microcomputer 64 in the TV main unit 3.

Figure 11:
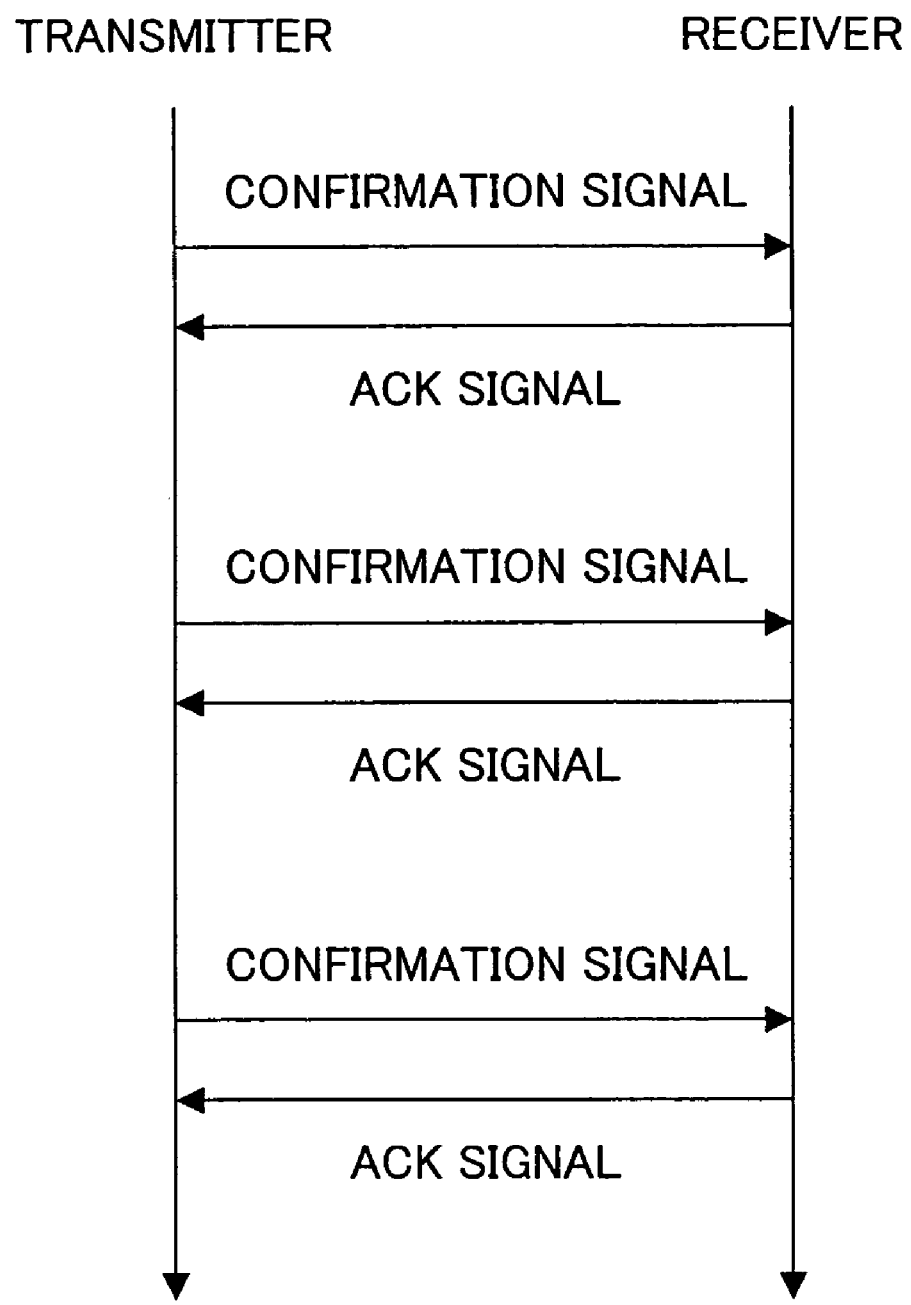
FIG. 11 is an explanatory diagram showing a control command transmitted and received between the central wireless unit and the TV main unit of the wireless AV system shown in FIG. 1.

FIG. 11 shows signals transmitted and received between the transmitter corresponding to the central wireless unit 2 and the receiver corresponding to the TV main unit 3. A confirmation signal is a signal transmitted by the transmitter in order to confirm the presence of the receiver. An ACK signal is a signal which indicates that the confirmation signal has been received by the receiver. The ACK signal is transmitted by the receiver, which has received the confirmation signal. Further, the confirmation signal may be a command signal. Two-way communication like this makes it possible for the transmitter to see whether or not the reception is done, by checking a status of data.

According to the example shown in FIG. 11, the ACK signal is transmitted every time the confirmation signal is transmitted. However, once the receiver receives the confirmation signal, the ACK signal may be transmitted regularly even without receipt of the confirmation signal. Alternatively, even when no confirmation signal is transmitted, the ACK signal may be transmitted regularly.

Figure 12:
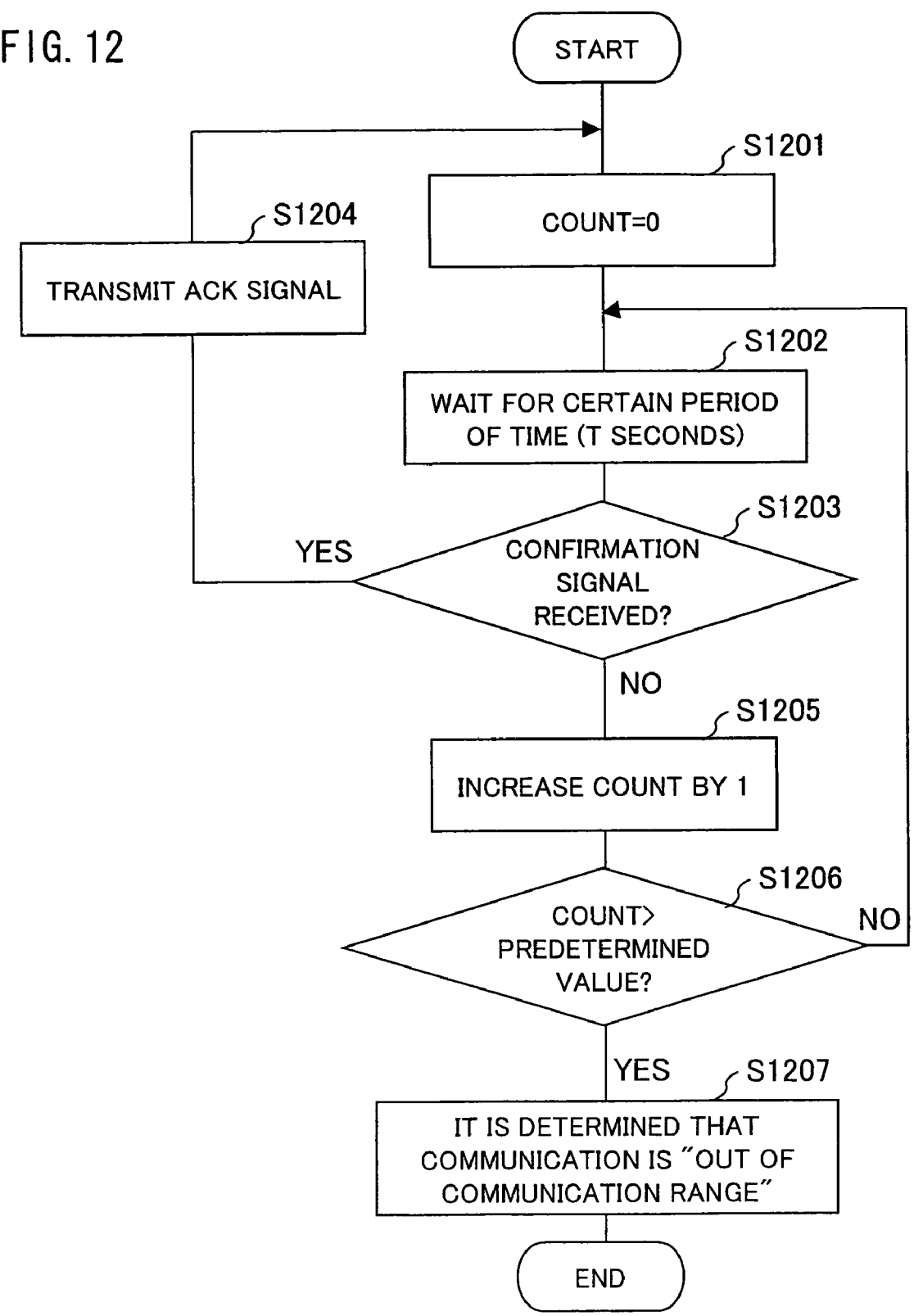
FIG. 12 is a flow chart showing a process of determining "out of communication range" in the TV main unit of the wireless AV system shown in FIG. 1.

FIG. 12 shows a process executed on the confirmation-signal-receiving end (the receiver in this case). First, a count is set to 0 (S1201), and a step of waiting for a predetermined period of time (T seconds) is executed (S1202). (Hereinafter, this step is referred to as "waiting step".) Then, it is determined whether or not the confirmation signal has been received during the waiting step (S1203). When the confirmation signal has been received (YES in S1203), the ACK signal is transmitted (S1204). Meanwhile, when the confirmation signal has not been received (NO in S1203), the count is increased by 1 (S1205). Next, the value of the count and a predetermined value are compared (S1206), and when the count value is smaller than the predetermined value (NO), the process returns to the waiting step (S1202). Meanwhile, when the count value exceeds the predetermined value (YES in S1206), it is determined that communication is "out of communication range" (S1207).

The predetermined value here is a value related to time T corresponding to the waiting step. Specifically, T seconds multiplied by the predetermined value equals approximately 5 seconds. The predetermined value is not limited to this but may be set at an optimum value depending on the situation.

Figure 13:
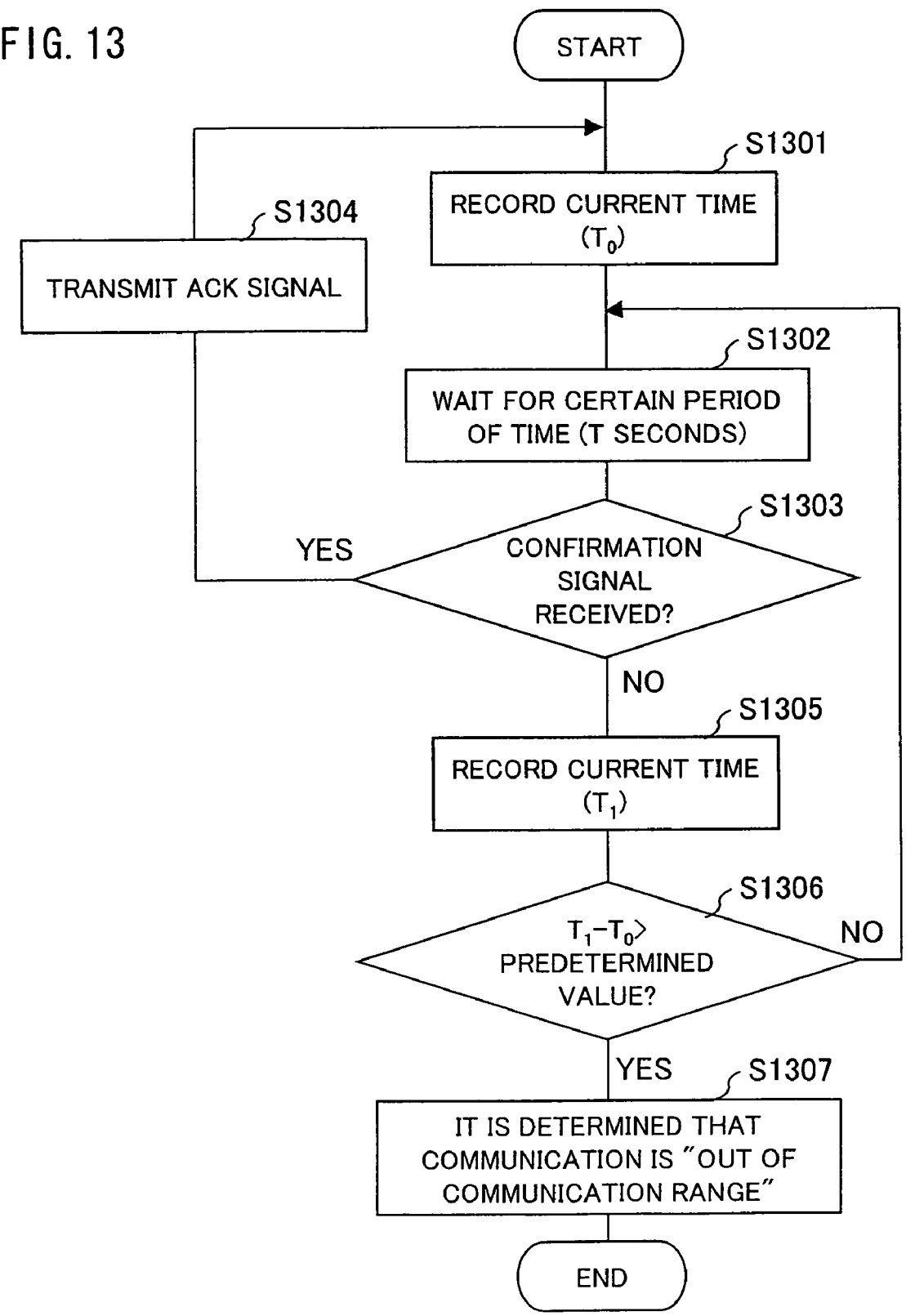
FIG. 13 is a flow chart showing a process of determining "out of communication range" in the TV main unit of the wireless AV system shown in FIG. 1.

FIG. 13 shows an example in which a process equivalent to that of FIG. 12 is realized by alternative means. First, a current time (T0) is recorded (S1301), and a step of waiting for a predetermined period of time (T seconds) is executed (S1302) (Hereinafter, this step is referred to as waiting step".) Then, it is determined whether or not the confirmation signal has been received during the waiting step (S1303). When the confirmation signal has been received (YES in S1303), the ACK signal is transmitted (S1304). Meanwhile, when the confirmation signal has not been received (NO in S1303), the current time (T1) is recorded (S1305). Next, a difference value between T1 and T0 is compared with a predetermined value (S1306), and when the difference value is smaller than the predetermined value (NO), the process returns to the waiting step (S1302). Meanwhile, when the difference value exceeds the predetermined value (YES in S1306), it is determined that communication is "out of communication range" (S1307).

The foregoing processes are processes executed on the confirmation-signal-receiving end. In the following, processes executed on the ACK-signal-receiving end are described.

Figure 14:
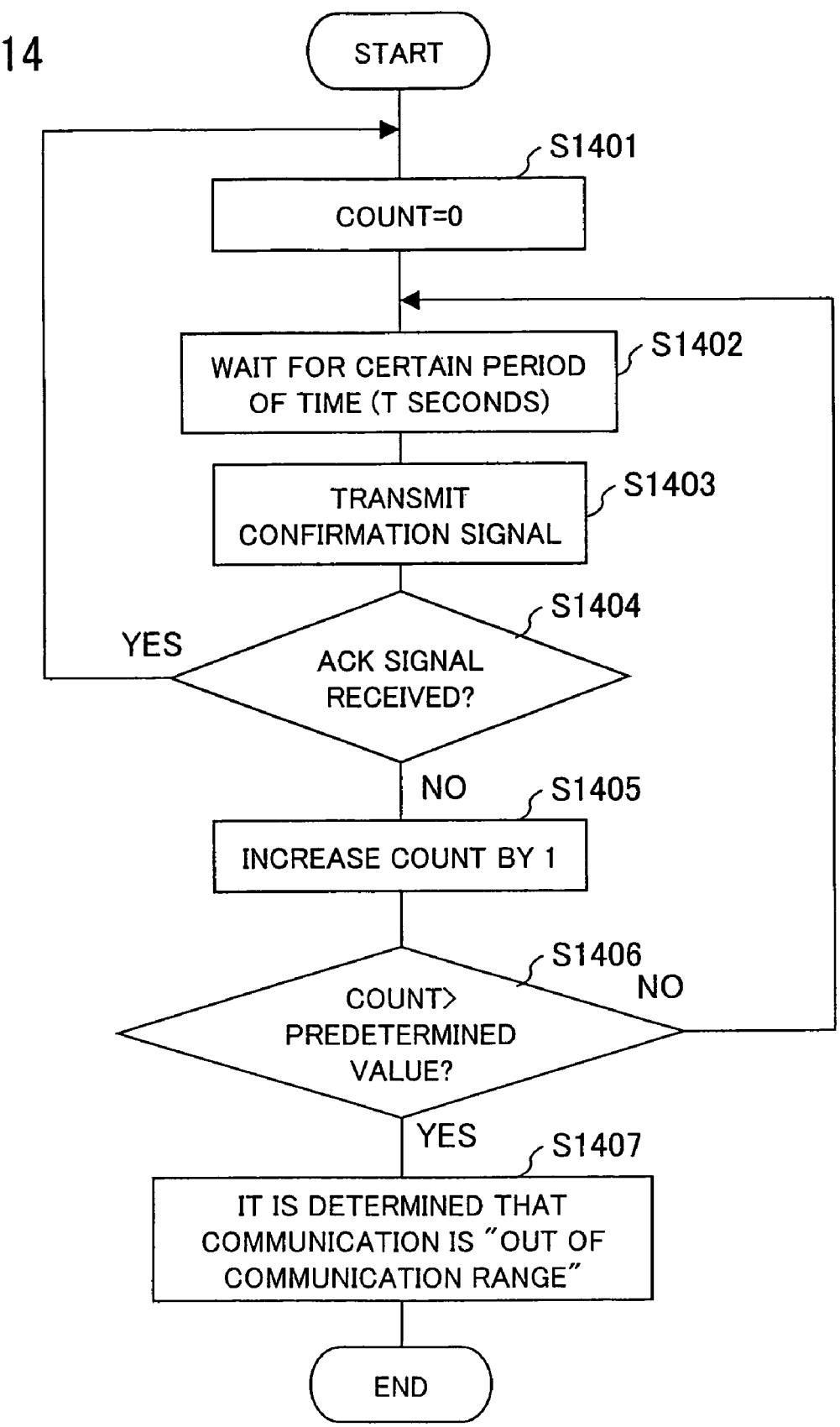
FIG. 14 is a flow chart showing a process of determining "out of communication range" in the central wireless unit of the wireless AV system shown in FIG. 1.

As shown in FIG. 14, first, a count is set to 0 (S1401), and a step of waiting for a predetermined period of time (T seconds) is executed (S1402). (Hereinafter, this step is referred to as waiting step".) Next, the confirmation signal is transmitted (S1403). Then, it is determined whether or not the ACK signal has been received (S1404). When the ACK signal has been received (YES in S1404), the process returns to step S1401. Meanwhile, when the ACK signal has not been received (NO in S1404), the count is increased by 1 (S1405). Next, the value of the count and a predetermined value are compared (S1406), and when the count value is smaller than the predetermined value (NO), the process returns to the waiting step (S1402). Meanwhile, when the count value exceeds the predetermined value (YES in S1406), it is determined that communication is "out of communication range" (S1407).

Figure 15:
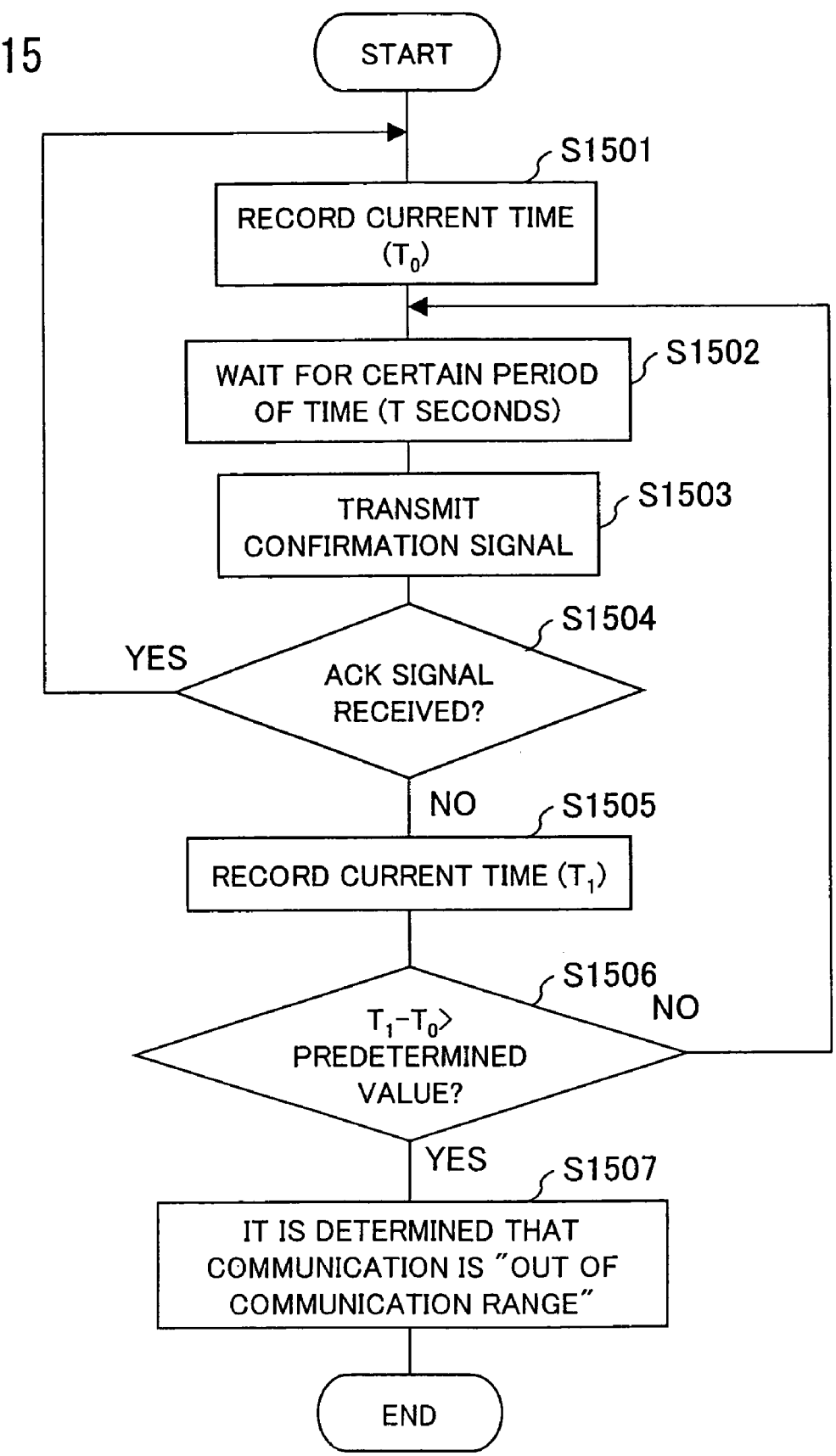
FIG. 15 is a flow chart showing a process of determining "out of communication range" in the central wireless unit of the wireless AV system shown in FIG. 1.

FIG. 15 shows an example in which a process equivalent to that of FIG. 14 is realized by alternative means. First, a current time (T0) is recorded (S1501), and a step of waiting for a predetermined period of time (T seconds) is executed (S1502). (Hereinafter, this step is referred to as waiting step".) Next, the confirmation signal is transmitted (S1503). Then, it is determined whether or not the ACK signal has been received (S1504). When the ACK signal has been received (YES in S1504), the process returns to step S1501. Meanwhile, when the ACK signal has not been received (NO in S1504), the current time (T1) is recorded (S1505). Next, a difference value between T0 and T1 is compared with a predetermined value (S1506), and when the difference value is smaller than the predetermined value (NO), the process returns to the waiting step (S1502). Meanwhile, when the difference value exceeds the predetermined value (YES in S1506), it is determined that communication is "out of communication range" (S1507).

Thus, in the wireless AV system 1, the transmitter detects the ACK signal from the receiver, and the receiver detects the confirmation signal from the transmitter. When no response is made to the ACK signal or the confirmation signal, it is determined that communication is "out of communication range".

Figure 16:
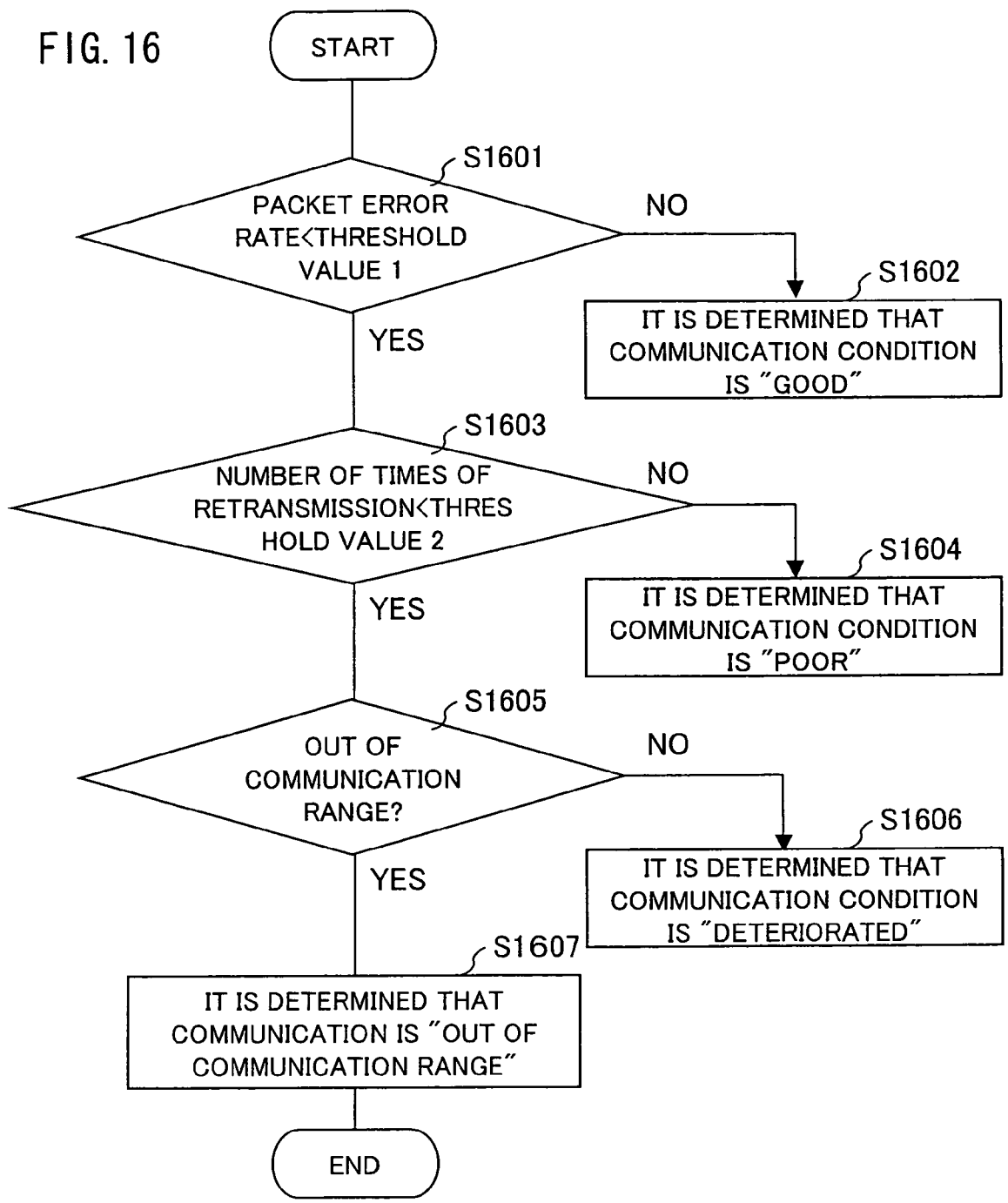
FIG. 16 is a flow chart showing a process of determining a communication condition in the TV main unit of the wireless AV system shown in FIG. 1.

Described below with reference to FIG. 16 is an example of a process of determining the communication condition as "good", "poor", "deteriorated", and "out of communication range", according to an error rate and other parameters. Note that this detection process is executed by the second SS-CPU 84 of the TV main unit 3 but may be executed by the TV microcomputer 64.

First, the packet error rate and a predetermined threshold value (first threshold value) Th1 are compared (S1601). The packet error rate refers to a rate of error contained in a received packet. When the packet error rate is smaller than the threshold value Th1 (YES in S1601), it is determined that the communication condition is "good" (S1602). The threshold value Th1 can be set for example at approximately 0.001. However, the threshold value Th1 is not to be limited to this and can be set at an optimum value depending on the situation.

Next, when the packet error rate is larger than the threshold value Th1 (NO in S1601), the number of times of retransmission and a predetermined threshold value (second threshold value) Th2 are compared (S1603). The number of times of retransmission refers to the number of times of transmitting the packet when the packet error rate is high and the packet becomes unrecoverable. When the number of times of retransmission is smaller than the threshold value Th2 (YES in S1603), it is determined that the communication condition is "poor" (S1604). Preferably, the threshold value Th2 is set to an upper limit above which an image is distorted. In this case, the "poor" communication condition refers to a condition under which the image is distorted. The threshold value Th2 can be set for example at approximately 3. However, the threshold value Th2 is not to be limited to this and can be set at an optimum value depending on the situation.

Then, when the number of times of the transmission is larger than the threshold value Th2 (NO in S1603), it is determined whether the communication condition is out of communication range (S1605). This determination step can be executed through the procedures shown in FIGS. 12 and 13 as described above. That is, the determination step is executed by monitoring whether or not the TV main unit 3 receives the "confirmation signal" within a predetermined period of time and whether or not the central wireless unit 2 receives the "ACK signal" within a predetermined time. The confirmation signal is a signal which the central wireless unit 2 transmits so as to confirm the presence of the TV main unit 3, which serves as its communication partner. The ACK signal is a signal which the TV main unit 3 transmits on receiving the confirmation signal. When it is determined that the communication condition is not out of communication range (NO in S1605), it is determined that the communication condition is "deteriorated" (S1606). Meanwhile, when it is determined that the communication condition is out of communication range, it is finally determined that the communication condition is "out of communication range" (S1607).

In FIG. 16, the determination steps (S1601 and S1603) are executed by using both the packet error rate and the number of times of retransmission. However, the communication condition may be determined by comparing only the packet error rate with the two threshold values. Similarly, the communication condition may be determined by comparing only the number of times of retransmission with the two threshold values. It is needless to say that use of more than two threshold values allows for more detailed determination. Therefore, for example, the communication condition can be determined by carrying out both (i) the two-step determination using the packet error rate and (ii) the two-step determination using the number of retransmission.

As described above, the communication (radio wave reception) condition is detected by using the "error rate" and the "number of times of retransmission request made based on the error rate". In addition, the communication (radio wave reception) condition can be detected by using other parameters such as a "field intensity", a "temporal change in the error rate", a "temporal change in the field intensity" and a "temporal change in the number of times of retransmission". Particularly, in a low-power mode for restraining power consumption, the radio wave condition is preferably determined in accordance with the field intensity, under such conditions that no video and/or audio data is transmitted and received.

Figure 18:
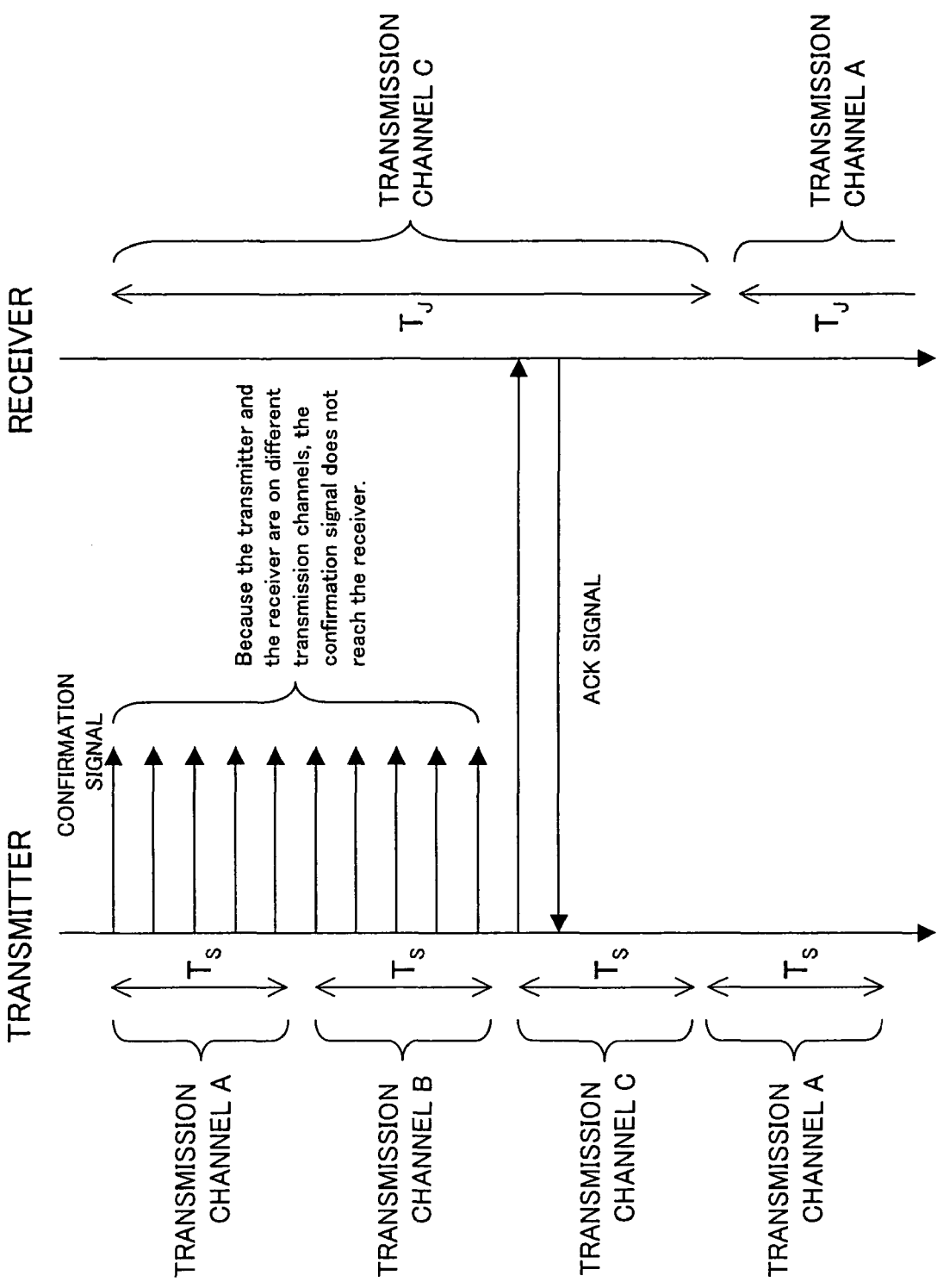
FIG. 18 is an explanatory diagram showing an example of transmission channel switching by means of the central wireless unit and the TV main unit of the wireless AV system shown in FIG. 1.

Described below with reference to FIGS. 17 and 18 are (i) a transmission channel switching process and (ii) a transmission channel switching determination. These processes are executed by the first SS-CPU in the central wireless unit 2 and the second SS-CPU in the TV main unit 3, but may be executed by the central wireless microcomputer 37 in the central wireless unit 2 and by the TV microcomputer 64 in the TV main unit 3.

As shown in FIG. 17, first, the transmission channel switching determination is carried out in the transmitter (the central wireless unit 2) (S1701). The transmission channel switching determination is carried out under such conditions that, e.g., the "out of communication range" state continues for more than a predetermined period of time. When a result of the transmission channel switching determination is "YES" (YES in S1701), the communication condition changes to "NOW SEARCHING FOR CHANNEL", so that the transmission channels are switched (S1702).

It is assumed that the channels used here for the wireless transmission are three transmission channels of a "transmission channel A", a "transmission channel B", and a "transmission channel C". The transmission channel switching is carried out in the order of the transmission channel A, the transmission channel B, the transmission channel C, the transmission channel A . . . . For example, when the transmission channel B is currently used, the channel switching is carried out from the transmission channel B to the transmission channel C in accordance with the process of the step S1702.

Next, the confirmation signal is transmitted (S1703). Then, it is determined whether or not the transmitter receives the ACK signal (S1704). When the ACK signal is received from the receiver (YES in S1704), the transmission channel is fixed and communication is performed thereafter. At this time, the communication condition changes from "NOW SEARCHING FOR TRANSMISSION CHANNEL" to "GOOD RECEPTION".

Meanwhile, when the transmitter does not receive the ACK signal from the receiver (NO in S1704), comparison is carried out between (i) a period of time elapsing since the switching of the transmission channels, and (ii) a predetermined time TS (S1705). When the elapsed time is shorter than the predetermined time TS (NO in S1705), the process returns to the step of transmitting the ACK signal (S1703). Meanwhile, when the elapsed time is longer than the predetermined time (YES in S1705), the process returns to the step of switching the transmission channels (S1702).

In the following, processing at the receiver (TV main unit 3) is described in the same manner.

First, the transmission channel switching determination is carried out (S1711). When a result of the transmission channel switching determination is "YES" (YES in S1711), the communication condition changes to "NOW SEARCHING FOR TRANSMISSION CHANNEL", so that the transmission channels are switched (S1712).

Next, it is determined whether or not the receiver receives the confirmation signal (S1713). When the confirmation signal is received from the transmitter (YES in S1713), the channel is fixed and the ACK signal is transmitted to the transmitter (S1714), so that subsequent communication is performed. At this time, the communication condition changes from "NOW SEARCHING FOR TRANSMISSION CHANNEL" to "GOOD RECEPTION".

Meanwhile, when the receiver does not receive the confirmation signal from the transmitter (NO in S1713), comparison is carried out between (i) a period of time elapsing since the switching of the transmission channels, and (ii) a predetermined period of time TJ (S1715). When the elapsed time is shorter than the predetermined time TJ (NO in S1715), the process returns to the step of determining the reception of the confirmation signal (S1713). Meanwhile, when the elapsed time is longer than the predetermined time TJ (YES in S1715), the process returns to the step of switching the transmission channels (S1712).

The predetermined time TJ in the receiver is made longer than the predetermined period of time TS at the transmitter. In this way, even when the transmitter and the receiver simultaneously carry out the process of switching the transmission channels, they can communicate with each other on the same channel. For example, when the channel switching is carried out in the order of the three transmission channels A, B, and C, the predetermined time TJ is preferably greater than the predetermined time TS multiplied by three (TJ>TS×3).

FIG. 18 is an explanatory diagram showing one example of a timing with which the transmitter and the receiver simultaneously carries out the transmission channel switching among the transmission channels A, B, and C. As shown in FIG. 18, the transmitter carries out the transmission channel switching every predetermined time TS in the order of the transmission channels A, B, and C. Whereas, the receiver carries out the transmission channel switching every predetermined time TJ in the order of the transmission channels C, A, and B. Note here that the predetermined time TJ is greater than the predetermined time TS multiplied by three (TJ>TS×3).

When the transmitter transmits the confirmation signal on each of the transmission channels A and B, the receiver selects the transmission channel C. Therefore, since the transmitter and the receiver are on different channels, the confirmation signal does not reach the receiver. Thereafter, when the transmitter transmits the confirmation signal on the transmission channel C, the receiver is still on the transmission channel C. Since the transmitter and the receiver are on the same channel, the ACK signal is transmitted to the transmitter. In this way, the transmitter and the receiver communicate with each other on the transmission channel C.

The central wireless unit 2 and the TV main unit 3 of the wireless AV system 1 may detect and indicate the communication condition according to either (i) the video and/or audio data or (ii) the control command (i.e., the "confirmation signal", the "ACK signal", and the other signals shown in FIG. 11) containing transmission channel switching information. In either case, the same message is used to indicate the transmission condition. When the transmission condition of any one of the video data, the audio data, and the control command becomes poor, the indication message is displayed. Examples of the indication message include: "OUT OF COMMUNICATION RANGE, which indicates that the wireless terminal is out of reach of radio waves; "POOR RECEPTION", which indicates that the wireless terminal is in poor radio wave conditions; "NOW SEARCHING FOR TRANSMITTER", which indicates that the wireless terminal is switching transmission channels so as to find a transmitter to communicate with; "NOW BEING CONNECTED", which indicates that the wireless terminal has found the transmitter and is now executing connection setup; and other messages.

The transmission channels are switched according to the control command containing "transmission channel switching information". Alternatively, the transmission channels are switched according to the communication condition (interruption of the communication) of the confirmation signal and the ACK signal as described above.

The former case corresponds to a case where the user sets a specific transmission channel. The transmission channel switching information includes information indicating which transmission channel is to be selected. Meanwhile, the latter case corresponds to a case where user setting is set at, for example, "AUTO (automatic)" such that a search for an unused channel is carried out.

As described above, the wireless AV system 1 according to the present embodiment includes the central wireless unit 2 serving as a base device and the TV main unit 3 serving as a wireless terminal. The TV main unit 3 includes the SS transmitter/receiver (T/R) unit 61, the TV section 63, the TV microcomputer 64, and the second SS-CPU 84. The SS T/R unit 61 receives an MPEG-2 stream and command transmission data each transmitted from the SS transmitter/receiver unit 36 of the central wireless unit 2, and decode the MPEG-2 stream and the like thus received. The TV section 63 carries out display in accordance with the video signal, and outputs sound in accordance with the audio signal. The TV microcomputer 64 controls the TV main unit 3 entirely. The second SS-CPU 84 detects a communication condition between the central wireless unit 2 and the TV main unit 3 according to the field intensity of the received radio wave and the retransmission request based on the error rate. According to the communication condition that has been detected, the TV microcomputer 64 causes the TV section 63 to OSD-display such reception sensitivity information messages indicating that video and/or audio data has been interrupted, that transmission channels are being switched, that connection is being made, and that the TV main unit 3 is out of communication range. Therefore, even when the transmission channels are switched or the communication condition is interrupted due to poor reception, an appropriate message is displayed so as to notify the user of the transmission condition. This allows the user to easily see whether an image has been interrupted, whether the transmission channels have been switched, or whether the communication condition has deteriorated due to an interference wave caused by the use of a microwave oven or the like. Thus, the user is not bothered by a feeling of discomfort. For example, the message such as "NOW BEING CONNECTED" is OSD-displayed even when no image is displayed, so that the user can intuitively understand why no image is displayed and can wait until an image is displayed. This makes it possible to prevent transmission channel operation from being unnecessarily performed in order to avoid a situation in which no image is displayed. By avoiding the user's unnecessary transmission channel switching operation and the like as such, it is possible to further shorten the time required until an image is displayed.

According to the present embodiment, as described in (4) Transition from "Out of Communication Range" State of FIG. 7, the messages are changed in accordance with the communication condition, so that the user can easily see the transition of the communication condition. These messages are merely examples, and any type of message may be indicated at any step. For example, when deterioration or restoration of the communication condition is anticipated, the communication condition may be indicated by means of estimated time elapsing until an image is displayed and an image character indicating the estimated time. This facilitates the user's understanding.

Further, when the reception condition is deteriorating, the user is given an instruction on what to do next (e.g., "RECEPTION CONDITION BEING DETERIORATED. MOVE TO BETTER RECEPTION AREA" or "RECEPTION CONDITION SUDDENLY DETERIORATED. KEEP AWAY FROM OBSTACLE SUCH AS MICROWAVE OVEN"), the instruction being displayed/vocalized. This causes the system to be more user-friendly.

According to the present embodiment, the TV section 63 OSD-displays a message indicating a transmission condition of video and/or audio data or other data, with the result that the message is notified. However, the message may be vocalized by using a voice synthesis LSI. Alternatively, the message may be both displayed and vocalized for indication. Further, the display method is not limited to OSD display.

Furthermore, according to the present embodiment, the period of time during which the communication is interrupted is measured, and one of the transmission channels is maintained until the predetermined period of time has elapsed since the interruption of the communication. This makes it possible to prevent a frequent switching of the transmission channels and to maintain an optimum communication condition entirely in the network.

Note that the wireless AV system 1 is not limited to the foregoing embodiment, but may be varied in many ways as long as it does not depart from the gist of the present invention. For example, although the wireless AV system 1 according to the foregoing embodiment is applied to a portable TV serving as a wireless AV device, it can be applied not only to a TV receiver but also to a wireless communication apparatus or a combination thereof. Examples of the AV device may include a VTR (video tape recorder), an HDD player, and a DVD player. Further, the apparatus capable of transmitting and receiving data may be an apparatus which has information device functions, such as a personal computer. That is, the wireless AV system 1 can be applied to all systems. Further, transmission and reception data may contain any type of content.

Further, in the present embodiment, the wireless AV system 1 is applied to, but is not to be limited to, a TV receiver. The wireless AV system 1 can be applied to a tuner, a personal computer, and other AV devices using tuners, as described above.

Further, the types of the processing sections constituting the apparatuses of the wireless AV system 1 and the types and formats of configuration information are not to be limited to those described in the foregoing embodiment.

Further, the BS tuner and the U/V tuner are used to accommodate to two types of broadcasting; however, the number of types of broadcasting and the types of broadcasting are not limited to these. For example, a CS tuner can be used.

Further, in the present embodiment, names such as "wireless communication apparatus" and "wireless AV system" are used for the sake of convenience in the description, but such names as "wireless communication device", "AV device", "channel selection apparatus", and the like may be used.

Further, according to the present embodiment, the receiving end (TV main unit 3) is provided with the "indication means". However, the transmitting end (central wireless unit 2) may be provided with the indication means such as a display panel, an LED, or the like. That is, the wireless AV system according to the present invention may be arranged such that either the transmitting end or the receiving end is provided with the indication means for indicating a reception condition of the receiving end. However, the detection of the communication condition is preferably performed by the receiving end (TV main unit 3).

Each of the apparatuses of the wireless AV system 1 described above can be realized by using a program for causing the apparatus to function. This program is stored in a computer-readable storage medium. In the present invention, such a computer program storage medium may be a main memory. Alternatively, a storage medium may be used which can be read by inserting the storage medium in an external storage device. In either of the cases, the contained program may be arranged so as to be accessible to a CPU which will execute the program. Further, the program may be arranged so as to be read and then downloaded to a program storage area (not shown) where the program is executed. Assume that the download program is prestored in the apparatus.

In addition, the program medium is a storage medium arranged so that it can be separated from the main body Examples of such a program medium include a tape, such as a magnetic tape and a cassette tape; a magnetic disk, such as a floppy (trademark) disk and a hard disk; an optical disc, such as a CD/MO/MD/DVD; a card, such as an IC card and an optical card; and a semiconductor memory, such as a mask ROM, an EPROM (erasable programmable read only memory), an EEPROM (electrically erasable programmable read only memory), or a flash ROM. All these storage media hold a program in a fixed manner.

Alternatively, if there is provided means (not shown) which can be connected to an external communications network, the program medium may be a storage medium carrying the program in a flowing manner as in the downloading of a program over the communications network via the means. Further, when the program is downloaded over a communications network in this manner, the download program may be prestored in the apparatus or installed from another storage medium. The storage medium may contain data as well as a program.

The present embodiment is not to limit the scope of the present invention, but can be varied in many ways within the scope of the present invention. For example, the following arrangements are possible.

A wireless communication apparatus of the present invention may include: communication means for transmitting and receiving either (i) video and audio data, or (ii) a control command containing transmission channel switching information; communication condition detection means for detecting a communication condition; and indication means for indicating at least a transmission condition of the video and audio data, according to the communication condition detected by the communication condition detection means.

Further, the wireless communication apparatus may include transmission channel maintaining means for (i) measuring time from which communication is interrupted, and (ii) maintaining a transmission channel until a predetermined period of time has elapsed since interruption of the communication.

The communication means may transmit either (i) the video and audio data, or (ii) the control command, in accordance with an SS (spread spectrum) wireless method.

The communication means may transmit the video and audio data in a form of an MPEG stream encoded in conformity with an MPEG-2 encoding method.

The communication means may perform low-power short-distance two-way wireless communication.

Further, more preferably and more specifically, the communication means operates in conformity with Bluetooth, UWB, or wireless LAN.

More preferably, the communication condition detection means detects the communication condition according to at least one of (i) a field intensity of a received radio wave, (ii) an error rate, and (iii) a number of times of retransmission request made based on the error rate.

More preferably, the communication condition detection means detects the communication condition between wireless communication apparatuses with which a communication link is established.

Further, the indication means may indicate at least any one of reception sensitivity information items indicating that the video and audio data has been interrupted, that the transmission channels are being switched, that connection is being made, and that the wireless terminal is out of communication range.

The indication means may either display a message by using display means or carries out message sound production by using audio output means.

A wireless AV system of the present invention has a plurality of wireless communication apparatuses connected to each other through a wireless network, and each of the wireless communication apparatuses may be the apparatus according to the foregoing wireless communication apparatus.

Further, more preferably and more specifically, the wireless communication apparatus is a television receiver including: a display device; a broadcast receiving tuner; and a central device for transmitting video and audio data to the display device.

Further, an operation control program of the present invention may be a program for causing a computer to execute a control process in a plurality of wireless communication apparatuses constituting a wireless network, the process including the steps of: transmitting and receiving either (i) video and audio data, or (ii) a control command containing transmission channel switching information; detecting a communication condition; and indicating at least a transmission condition of video and audio data, according to the communication condition that has been detected.

Furthermore, a storage medium of the present invention may store an operation control program for causing a computer to execute a control process in a plurality of wireless communication apparatuses constituting a wireless network, the process including the steps of: transmitting and receiving either (i) video and audio data, or (ii) a control command containing transmission channel switching information; detecting a communication condition; and indicating at least a transmission condition of video and audio data, according to the communication condition that has been detected.

Further, a wireless terminal of the present invention may include: communication means for exchanging, with a base device, either (i) video and/or audio data or (ii) a control command containing transmission channel switching information; communication condition detection means for detecting a communication condition; and indication means for indicating reception sensitivity information according to the communication condition detected by the communication condition detection means.

Further, a wireless terminal of the present invention may include: communication means for exchanging, with a base device, either (i) video and/or audio data, or (ii) a control command containing transmission channel switching information; communication condition detection means for detecting a communication condition; and indication means for indicating at least a transmission condition of video and/or audio data, according to the communication condition detected the communication condition detection means.

Furthermore, the wireless terminal of the present invention may include transmission channel maintaining means for (i) measuring time from which communication is interrupted, and (ii) maintaining a transmission channel until a predetermined period of time has elapsed since interruption of the communication.

Furthermore, the wireless terminal of the present invention may be arranged such that the communication condition detection means detects the communication condition according to at least one of (i) a field intensity of a received radio wave, (ii) an error rate, and (iii) a number of times of retransmission request made based on the error rate.

Furthermore, the wireless terminal of the present invention may be arranged such that the communication condition detection means detects the communication condition with the base device, with which a communications link is established.

The wireless terminal of the present invention may be arranged such that the indication means indicates at least any one of reception sensitivity information items indicating that the video and/or audio data has been interrupted, that the transmission channels are being switched, that connection is being made, and that the wireless terminal is out of communication range.

Further, a wireless terminal of the present invention may include: communication means for exchanging, with a base device, either (i) video and/or audio data, or (ii) a control command containing transmission channel switching information, the communication means receiving, from the base device, information indicative of a communication condition detected by the base device; and indication means for indicating reception sensitivity information, according to the information indicative of the communication condition which information has been received by the communication means.

Furthermore, the wireless terminal of the present invention may be arranged such that the indication means either displays a message by using display means or carries out message sound production by using audio output means.

Further, a wireless terminal of the present invention may include: communication means for exchanging, with a base device, either (i) video and/or audio data, or (ii) a control command containing transmission channel switching information; and transmission channel maintaining means for (i) measuring time from which communication is interrupted, and (ii) maintaining a transmission channel until a predetermined period of time has elapsed since interruption of the communication.

Furthermore, the wireless terminal of the present invention may be arranged such that the communication means transmits either (i) the video and/or audio data, or (ii) the control command in accordance with a spread spectrum wireless method.

Furthermore, the wireless terminal of the present invention may be arranged such that the communication means performs low-power short-distance two-way wireless communication in conformity to wireless LAN, or Bluetooth, and UWB (Ultra Wide Band).

Furthermore, the wireless terminal of the present invention may be arranged such that the communication means transmits the video and/or audio data in a form of an MPEG stream encoded in conformity with an MPEG-2 encoding method.

Furthermore, the wireless terminal of the present invention may include at least a display device for (i) displaying a video signal according to the video data that the display device receives, and/or (ii) displaying information sent from the base device with which a communications link is established, according to the control command that the display device receives.

Furthermore, a base device of the present invention may exchange, with the foregoing wireless terminal, either (i) video and/or audio data, or (ii) a control command containing transmission channel switching information.

Furthermore, the base device of the present invention may include communication condition detection means for detecting a communication condition and may transmit, to the foregoing wireless terminal, information indicative of the communication condition detected by the communication condition detection means.

Furthermore, the base device of the present invention may receive video and/or audio data sent from outside.

Furthermore, the base device of the present invention may receive video and/or audio data inputted from a broadcast receiving tuner.

Further, a wireless system of the present invention may be arranged so as to include: the foregoing wireless terminal; and a base device for exchanging, with the foregoing wireless terminal, either (i) video and/or audio data, or (ii) a control command containing transmission channel switching information.

Further, a wireless terminal control method of the present invention may be a method for controlling a wireless terminal which constitutes a wireless system having the wireless terminal and a base device connected to each other through a wireless network, the method including the steps of: exchanging, with the base device, either (i) video and/or audio data, or (ii) a control command containing transmission channel switching information; detecting a communication condition; and indicating reception sensitivity information, according to the communication condition that has been detected.

Further, a wireless terminal control method of the present invention may be a method for controlling a wireless terminal which constitutes a wireless system having a wireless terminal and a base device connected through a wireless network, the method including the steps of: exchanging, with the base device, either (i) video and/or audio data or (ii) a control command containing transmission channel switching information; detecting a communication condition; and indicating at least a transmission condition of the video and/or audio data according to the communication condition that has been detected.

Further, a wireless terminal control method of the present invention may be a method for controlling a wireless terminal which constitutes a wireless system having a wireless terminal and a base device connected through a wireless network, the method including the steps of: exchanging, with the base device, either (i) video and/or audio data or (ii) a control command containing transmission channel switching information; receiving, from the base device, information indicative of a communication condition detected at the base device; and indicating reception sensitivity information according to the communication condition that has been detected.

Further, a wireless terminal control method of the present invention may be a method for controlling a wireless terminal which constitutes a wireless system having a wireless terminal and a base device connected through a wireless network, the method including the steps of: exchanging, with the base device, either (i) video and/or audio data or (ii) a control command containing transmission channel switching information; and measuring a period of time during which communication is interrupted and maintaining a transmission channel until a predetermined period of time has elapsed since the communication is interrupted.

Further, a wireless terminal control program of the present invention may control the foregoing wireless terminal and may cause a computer to function as each of the means.

Further, a computer-readable storage medium of the present invention stores the foregoing wireless terminal control program.

Further, a wireless terminal according to the present invention may be arranged so as to include: communication means for exchanging, with a base device, either (i) video and/or audio data, or (ii) a control command containing transmission channel switching information; communication condition detection means for detecting a communication condition; and indication means for indicating at least a transmission condition of the control command, according to the communication condition detected by the communication condition detection means.

Further, a wireless terminal control method according to the present invention is a method for controlling a wireless terminal which constitutes a wireless system having the wireless terminal and a base device connected to each other through a wireless network, the method including the steps of: exchanging, with the base device, either (i) video and/or audio data, or (ii) a control command containing transmission channel switching information; detecting a communication condition; and indicating at least a transmission condition of the control command, according to the communication condition that has been detected.

According to the foregoing arrangement, it is possible to indicate a transmission condition of a control command transmitted and received between the wireless terminal and the base system. Examples of the control command are a "confirmation signal" and an "ACK signal". The "confirmation signal" is a signal which the base device transmits so as to confirm the presence of the wireless terminal, which serves as its communication partner. The "ACK signal" is a signal which the wireless terminal transmits on receiving the confirmation signal. Moreover, when the transmission condition of the control signal deteriorates, the wireless terminal notifies the user of the status for example by displaying an indication message. Examples of the indication message include: "OUT OF COMMUNICATION RANGE", which indicates that the wireless terminal is out of reach of radio waves; "POOR RECEPTION", which indicates that the wireless terminal is in a poor radio wave condition; "NOW SEARCHING FOR TRANSMITTER", which indicates that the wireless terminal is switching transmission channels so as to find a transmitter to communicate with; "NOW BEING CONNECTED", which indicates that the wireless terminal has found the transmitter and is now executing connection setup; and other messages.

Therefore, according to the foregoing wireless terminal, it is possible to prevent the user from being bothered by a feeling of discomfort even when an image display is interrupted due to transmission channel switching or the like, so that user-friendliness can be improved.

Furthermore, the wireless terminal according to the present invention may include transmission channel maintaining means for (i) measuring time from which communication is interrupted, and (ii) maintaining a transmission channel until a predetermined period of time has elapsed since interruption of the communication.

According to the foregoing arrangement, it is possible to prevent frequent transmission channel switching and to maintain an optimum communication condition entirely in the network.

Furthermore, the wireless terminal according to the present invention may be arranged such that the communication condition detection means detects the communication condition according to at least one of (i) a field intensity of a received radio wave, (ii) an error rate, and (iii) a number of times of retransmission request made based on the error rate.

According to the foregoing wireless terminal, the field intensity of the received radio wave, the error rate, and the number of times of retransmission request made based on the error rate can be suitably used as parameters for detecting the communication condition. Further, by combining the plural types of parameters, the communication condition can be detected effectively.

Furthermore, the wireless terminal according to the present invention may be arranged such that the communication condition detection means detects the communication condition with the base device, with which a communications link is established.

According to the foregoing arrangement, it is possible to detect the communication condition with the base device, with which a communications link is established.

Furthermore, the wireless terminal according to the present invention may be arranged such that the indication means indicates at least any one reception sensitivity information items indicating that the video and/or audio data has been interrupted, that the transmission channels are being switched, that connection is being made, and that the wireless terminal is out of communication range.

According to the foregoing arrangement, it is possible to indicate at least any one of the reception sensitivity information items indicating that the video and/or audio data has been interrupted, that the transmission channels are being switched, that the connection is being made, and that the wireless terminal is out of communication range.

Furthermore, the wireless terminal according to the present invention may be arranged such that the indication means either displays a message by using display means or carries out message sound production by using audio output means.

According to the foregoing arrangement, it is possible to provide the user with information on various contents indicative of the communication condition by displaying the message or carrying out the message sound production.

Furthermore, the wireless terminal according to the present invention may be arranged such that the wireless terminal switches the transmission channels either (i) every cycle corresponding to not less than a period during which the base device selects all the transmission channels, or (ii) every cycle corresponding to a period during which the base device selects all the transmission channels and which corresponds to time in which the wireless terminal maintains one of the transmission channels.

According to the foregoing arrangement, even when the wireless terminal and the base device simultaneously switch the transmission channels, it is possible to make sure to find a transmission channel on which the wireless terminal and the base device communicate with each other. Thus, the communication can be established by switching the transmission channels.

Furthermore, the wireless terminal according to the present invention may be arranged such that the communication means transmits either (i) the video and/or audio data, or (ii) the control command, in accordance with a spread spectrum wireless method.

The foregoing wireless terminal is suitable for a wireless communication apparatus operating in accordance with the spread spectrum wireless method.

Furthermore, the wireless terminal according to the present invention may be arranged such that the communication means performs low-power short-distance two-way wireless communication in conformity to wireless LAN, or Bluetooth, and UWB (Ultra Wide Band).

The foregoing wireless terminal is suitable for a wireless communication apparatus which performs low-power short-distance two-way wireless communication in conformity to wireless LAN, or Bluetooth, and UWB (Ultra Wide Band).

Furthermore, the wireless terminal according to the present invention may be arranged such that the communication means transmits the video and/or audio data in a form of an MPEG stream encoded in conformity with an MPEG-2 encoding method.

The foregoing wireless terminal is suitable for a wireless communication apparatus which transmits the video and/or audio data in the form of the MPEG stream encoded in conformity with the MPEG-2 encoding method.

Furthermore, the wireless terminal according to the present invention may include a display device for displaying a video signal according to the video data that the display device receives.

The foregoing wireless terminal is suitable, for example, for a separate-display wireless TV receiver including a display device for displaying a video signal according to the video data that the display device receives.

Furthermore, the wireless terminal according to the present invention may be arranged such that the communication condition detection means determines whether or not an image displayed by the display device is distorted.

According to the foregoing arrangement, it is possible to detect a distortion of an image displayed by the display device and send a warning to the user.

Further, a base device according to the present invention may exchange, with the foregoing wireless terminal, either (i) video and/or audio data, or (ii) a control command containing transmission channel switching information.

According to the foregoing arrangement, it is possible to realize the base device which exchanges, with the foregoing wireless terminal, either (i) the video and/or audio data, or (ii) the control command containing the transmission channel switching information.

Furthermore, the base device according to the present invention may include communication condition detection means for detecting a communication condition and may transmit, to the foregoing wireless terminal, information indicative of the communication condition detected by the communication condition detection means.

According to the foregoing arrangement, the information indicative of the communication condition can be transmitted to the wireless terminal. Therefore, the wireless terminal can notify the user of the communication condition detected by the base device.

Furthermore, the base device according to the present invention may be arranged such that the wireless terminal switches the transmission channels either (i) every cycle corresponding to not less than a period during which the wireless terminal selects all the transmission channels, or (ii) every cycle corresponding to a period during which the base device selects all the transmission channels and which corresponds to time in which the wireless terminal maintains one of the transmission channels.

According to the foregoing arrangement, even when the wireless terminal and the base device simultaneously switch the transmission channels, it is possible to make sure to find a transmission channel on which the wireless terminal and the base device communicate with each other. Thus, the communication can be established by switching the transmission channels.

Furthermore, the base device according to the present invention may be arranged such that the video and/or audio data is received via a broadcast receiving tuner.

The foregoing base device is suitable, for example, for a separate-display wireless TV receiver which transmits, to the wireless terminal, the video and/or audio data received via the broadcast receiving tuner.

Further, a wireless system according to the present invention may include: the foregoing wireless terminal; and a base device for exchanging, with the foregoing wireless terminal, either (i) video and/or audio data, or (ii) a control command containing transmission channel switching information.

According to the foregoing arrangement, it is possible to indicate a transmission condition of the control command transmitted and received between the wireless terminal and the base device. Therefore, according to the foregoing wireless terminal, it is possible to prevent the user from being bothered by a feeling of discomfort even when an image display is interrupted due to transmission channel switching or the like, so that user-friendliness can be improved.

The foregoing wireless terminal may be realized by a computer. In such a case, a computer-readable storage medium storing a receiver control program for causing a computer to function as each of the means is also included in the scope of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

A wireless system of the present invention is suitable for, but is not limited to, a home AV network system, such as a separate-display wireless TV receiver, which transmits video and/or audio data by wireless. The wireless system can be widely applied to a wireless communication device such as a mobile phone/PHS (Personal Handyphone System) (registered trademark) or PDA (Personal Digital Assistant).

The invention claimed is:

1. A wireless terminal, comprising:
    communication means for exchanging, with a base device which communicates using a plurality of transmission channels, either (i) video data and/or audio data, or (ii) a control command containing transmission channel switching information;
    the transmission channels comprising a number of communication channels for communication between the base device and the wireless terminal;
    communication condition detection means for detecting a communication condition; and
    indication means for indicating at least a transmission condition of the control command, according to the communication condition detected by the communication condition detection means, wherein
    the wireless terminal switches the transmission channels (i) every cycle corresponding to at least a period during which the base device selects in turn each one of the plurality of transmission channels, and (ii) every cycle corresponding to a period of time during which the base device selects each one of the plurality of transmission channels and only for a time which corresponds to time during which the wireless terminal maintains the selected one of the transmission channels based on the communication condition.

2. The wireless terminal according to claim 1, further comprising:
    transmission channel maintaining means for (i) measuring time from which communication is interrupted, and (ii) maintaining a transmission channel until a predetermined period of time has elapsed since interruption of the communication.

3. The wireless terminal according to claim 1, wherein the communication condition detection means detects the communication condition according to at least one of (i) an electric field intensity of a received radio wave, (ii) an error rate, and (iii) a number of times of retransmission request made based on the error rate.

4. The wireless terminal according to claim 1, wherein the communication condition detection means detects the communication condition with the base device, with which a communications link is established.

5. The wireless terminal according to claim 1, wherein the indication means indicates at least any one of reception sensitivity information items indicating that the video data and/or the audio data are interrupted, that transmission channels are being switched, that connection is being made, and that the wireless terminal is out of communication range.

6. The wireless terminal according to claim 1, wherein the indication means either displays a message by using display means or carries out message sound production by using audio output means.

7. The wireless terminal according to claim 1, wherein the communication means transmits either (i) the video data and/or the audio data, or (ii) the control command, in accordance with a spread spectrum wireless method.

8. The wireless terminal according to claim 1, wherein the communication means performs low-power short-distance two-way wireless communication in conformity to wireless LAN, or Bluetooth, and Ultra Wide Band.

9. The wireless terminal according to claim 1, wherein the communication means transmits the video data and/or the audio data in a form of an MPEG stream encoded in conformity with an MPEG-2 encoding method.

10. The wireless terminal according to claim 1, comprising:
    a display device for displaying a video signal according to the video data that the display device receives.

11. The wireless terminal according to claim 1, the communication condition detection means determines whether or not an image displayed by the display device is distorted.

12. A base device for exchanging, with the wireless terminal according to claim 1, either (i) video data and/or audio data, or (ii) a control command containing transmission channel switching information.

13. The base device according to claim 12, comprising:
    communication condition detection means for detecting a communication condition,
    the base device transmitting, to the wireless terminal, information indicative of the communication condition detected by the communication condition detection means.

14. The base device according to claim 12, wherein the wireless terminal switches the transmission channels either (i) every cycle corresponding to not less than a period during which the wireless terminal selects all the transmission channels, or (ii) every cycle corresponding to a period during which the base device selects all the transmission channels and which corresponds to time in which the wireless terminal maintains one of the transmission channels.

15. The base device according to claim 12, wherein the video data and/or the audio data is received via a broadcast receiving tuner.

16. A wireless system, comprising:
    the wireless terminal according to claim 1; and
    a base device for exchanging, with the wireless terminal, either (i) video data and/or audio data, or (ii) a control command containing transmission channel switching information.

17. A method for controlling a wireless terminal which constitutes a wireless system having the wireless terminal and a base device which communicates using a plurality of transmission channels, which are connected to each other through a wireless network, the transmission channels comprising a number of communication channels for communication between the base device and the wireless terminal, the method comprising the steps of:
    exchanging, with the base device, either (i) video data and/or audio data, or (ii) a control command containing transmission channel switching information;
    detecting a communication condition; and
    indicating a transmission condition of at least the control command according to the communication condition that has been detected, wherein
    the wireless terminal switches the transmission channels both (i) every cycle corresponding to at least a period during which the base device selects in turn each one of the plurality of transmission channels, and (ii) every cycle corresponding to a period of time during which the base device selects each one of the plurality of transmission channels and only for a time which corresponds to time during which the wireless terminal maintains the selected one of the transmission channels based on the communication condition.

18. A program for controlling the wireless terminal according to claim 1, the program causing a computer to function as each of the means.

19. A computer program product comprising a computer-readable storage medium, having encoded thereon computer readable program instructions executable by computer that cause the computer to control a wireless terminal which constitutes a wireless system having the wireless terminal and a base device which communicates using a plurality of transmission channels, the transmission channels comprising a number of communication channels for communication between the base device and the wireless terminal, which are connected to each other through a wireless network by performing the steps of:
- exchanging, with the base device, either (i) video data and/or audio data, or (ii) a control command containing transmission channel switching information;
- detecting a communication condition; and
- indicating a transmission condition of at least the control command according to the communication condition that has been detected, wherein the wireless terminal switches the transmission channels both (i) every cycle corresponding, to not less than a period of time during which the base device selects in turn each one of the plurality of transmission channels, and (ii) every cycle corresponding to a period of time during which the base device selects each one of the plurality of transmission channels and only for a time which corresponds to time during which the wireless terminal maintains the selected one of the transmission channels based on the communication condition.

* * * * *